(12) United States Patent
Balaga et al.

(10) Patent No.: US 7,792,331 B2
(45) Date of Patent: Sep. 7, 2010

(54) COMPOSITION OF RASTER AND VECTOR GRAPHICS IN GEOGRAPHIC INFORMATION SYSTEMS

(75) Inventors: Piotr Balaga, Miami, FL (US); Philip Landman, Davie, FL (US)

(73) Assignee: ACD Systems, Ltd., Victoria, British Columbia (CA)

( * ) Notice: Subject to any disclaimer, the term of this patent is extended or adjusted under 35 U.S.C. 154(b) by 978 days.

(21) Appl. No.: 10/880,940

(22) Filed: Jun. 29, 2004

(65) Prior Publication Data

US 2005/0285876 A1 Dec. 29, 2005

(51) Int. Cl.
- *G06K 9/00* (2006.01)
- *G06K 9/32* (2006.01)
- *G09C 5/00* (2006.01)

(52) U.S. Cl. .................. 382/113; 382/293; 382/294; 345/629; 345/632

(58) Field of Classification Search .............. 345/629, 345/632; 382/113, 293, 294
See application file for complete search history.

(56) References Cited

U.S. PATENT DOCUMENTS

| | | | | |
|---|---|---|---|---|
| 5,414,462 | A * | 5/1995 | Veatch | 348/135 |
| 5,857,066 | A * | 1/1999 | Wyche et al. | 345/420 |
| 6,636,804 | B1 * | 10/2003 | Joshi | 701/208 |
| 6,757,445 | B1 * | 6/2004 | Knopp | 382/285 |
| 6,870,545 | B1 * | 3/2005 | Smith et al. | 345/619 |
| 6,993,430 | B1 * | 1/2006 | Bellesfield et al. | 701/202 |
| 6,999,101 | B1 * | 2/2006 | Sanborn et al. | 345/619 |
| 7,007,228 | B1 * | 2/2006 | Carro | 715/513 |
| 7,107,285 | B2 * | 9/2006 | von Kaenel et al. | 707/104.1 |
| 7,148,898 | B1 * | 12/2006 | Howard et al. | 345/581 |
| 2003/0052896 | A1 * | 3/2003 | Higgins et al. | 345/619 |
| 2004/0125138 | A1 * | 7/2004 | Jetha et al. | 345/764 |

FOREIGN PATENT DOCUMENTS

| | | |
|---|---|---|
| WO | WO 01/98925 A2 | 12/2001 |
| WO | WO 01/98925 A3 | 12/2001 |

OTHER PUBLICATIONS

Open GIS Consortium, Inc., "OpenGIS Simple Features Specification for SQL."Rev. 1.1. 1999. pp. 3-28-4-2.*

(Continued)

*Primary Examiner*—Matthew C Bella
*Assistant Examiner*—Michael A Newman
(74) *Attorney, Agent, or Firm*—Blakely, Sokoloff, Taylor & Zafman LLP

(57) ABSTRACT

A method for editing composite geographical images, including importing a raster geographical map file, the raster file including geographical information identifying raster image data, global positioning reference data and a first projection that transforms geographical coordinates to linear coordinates, importing a vector geographical map file, the vector file including geographical information identifying vector objects, rendering a two-dimensional raster image including transforming linear coordinates to geographical coordinates according to the inverse of a prescribed second projection that transforms geographical coordinates to linear coordinates, and re-projecting the geographical coordinates to linear coordinates according to the first projection, rendering a two-dimensional vector image including projecting the vector objects according to the prescribed second projection, compositing the two-dimensional image raster image and the two-dimensional vector image as layers of a composite image, and editing the composite image. A system and a computer readable storage medium are also described and claimed.

34 Claims, 23 Drawing Sheets

OTHER PUBLICATIONS

Ritter, et al. "GeoTIFF Format Specification—GeoTIFF Revision 1.0." RemoteSensing.org. Dec. 28, 2000. Aug. 23, 2007 <http://www.remotesensing.org/geotiff/spec/geotiffhome.html>.*

Ritter et al. "GeoTIFF Format Specification—GeoTIFF Revision 1.0." RemoteSensing.org Dec. 28, 2000. Aug. 23, 2007 <http://www.remotesensing.org/geotiff/spec/geotiffhome.html>.*

Ritter, et al. "GeoTIFF Formal Specification—GeoTIFF Revision 1.0." RemoteSensing.org. Dec. 28, 2000. Aug. 23, 2007.*

PCT International Search Report and Written Opinion for PCT International Appln No. US2005/023497, mailed Oct. 27, 2005 (13 pages).

Lennert, Moritz, "Didacticiel GRASS", Aug. 11, 2003, pp. 1-151, XP002348307, Retrived from the Internet: URL: grass.itc.it/gdp/grass2tutor/grass50_t utorial_fr.pdf.

Bellamy, Jean-Claude, et al., "Using images regardless of their format", Advances in Scientific Visualization, Springer-Verlag Berlin, Germany, 1992, pp. 145-157, P009054999.

Evenden, Gerald I., The Mapgen Cartographic System,Proceedings of the International Symposium on Marine Positioning, Reidel Dordrecht, Netherlands, 1987, pp. 285-294, XP009054493.

Notification Concerning Transmittal of International Preliminary Report on Patentability Chapter 1 of the Patent Cooperation Treaty, with the International Preliminary Report, and the PCT written Opinion of the International Searching Authority, mailed Jan. 18, 2007, 8 pages.

Moritz, "Didacticiel Grasss" URL:grass.itc.it/gpd/grass5tutor/grass50_tutorial_fr.pdf, pp. 1-151, Aug. 11, 2003.

* cited by examiner

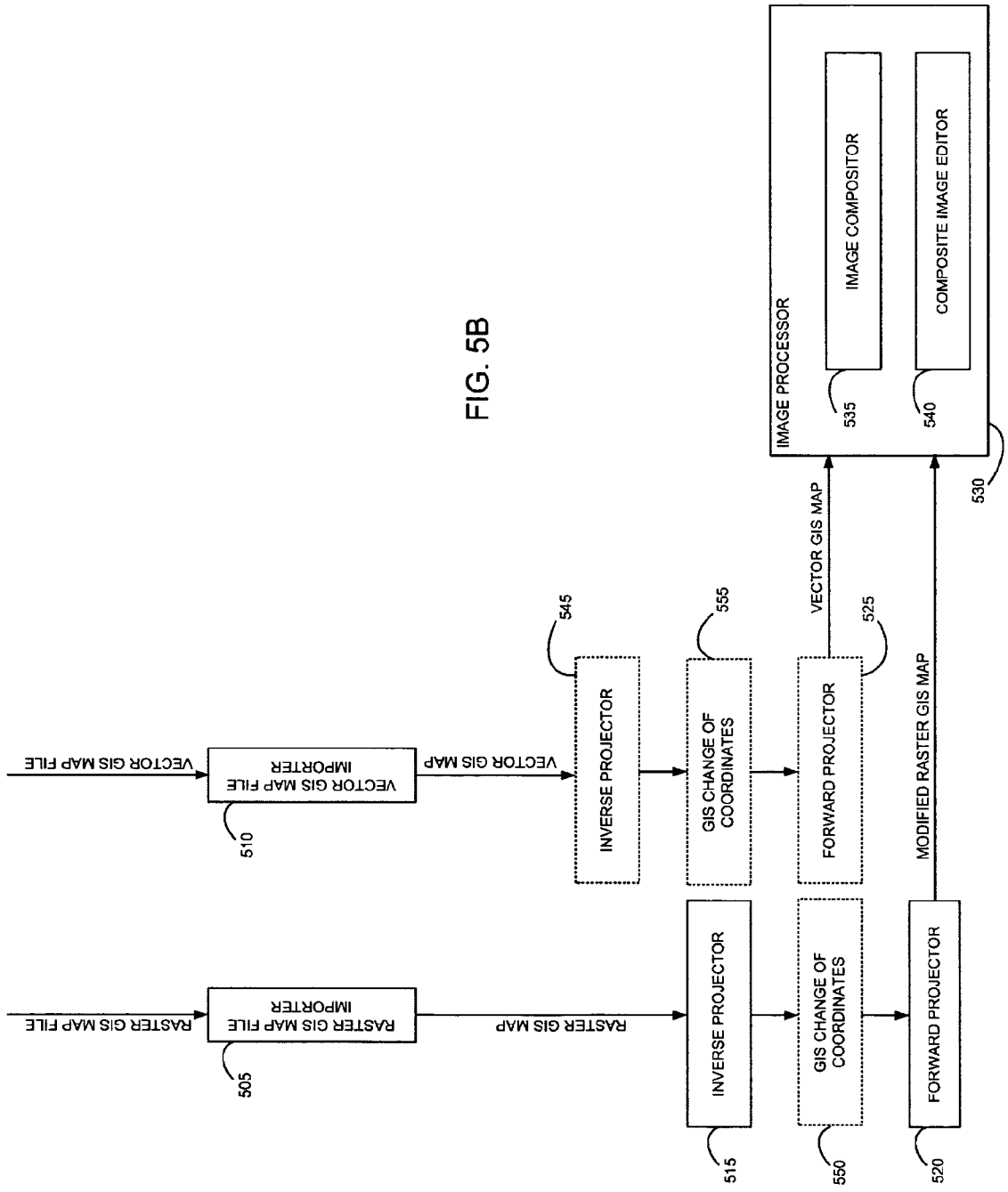

| FNODE | TNODE | LPOLY | RPOLY | LENGTH | MAJRDS | MAJRDS_ID | ROADWAY | LOCALNAME | USI |
|---|---|---|---|---|---|---|---|---|---|
| 3 | 1 | 2 | 2 | 1.318658263654E+01 | 1 | 1263 | 86030000 | DANIA BEACH BLVD | |
| 7 | 5 | 2 | 2 | 1.208556045925E+01 | 2 | 1232 | 86010000 | FEDERAL HWY/SE 6 A... | US 1 |
| 10 | 8 | 2 | 2 | 1.301517335608E+01 | 3 | 1074 | 86000101 | OLD FEDERAL HWY | |
| 12 | 9 | 2 | 2 | 1.272787820351E+01 | 4 | 1594 | 86503000 | DIXIE HIGHWAY | |
| 15 | 13 | 2 | 2 | 1.113640446643E-01 | 5 | 1072 | 86000099 | S 26TH AVE | |
| 18 | 16 | 2 | 2 | 5.270024741111E+00 | 6 | 1288 | 86070000 | NO LOCAL NAME | |
| 20 | 19 | 2 | 2 | 2.551771288938E+01 | 7 | 1071 | 86000098 | SW 32TH AVE | |
| 24 | 21 | 2 | 2 | 3.127008754152E+01 | 8 | 1191 | 86000413 | SW 40TH AVE | |
| 26 | 25 | 2 | 2 | 3.750521387440E+01 | 9 | 1070 | 86000097 | SW 48TH AVE | |
| 29 | 27 | 2 | 2 | 4.221951220063E+01 | 10 | 1065 | 86010000 | SW 56TH AVE | |
| 33 | 30 | 2 | 2 | 1.270751398208E+01 | 11 | 1469 | 86100000 | NO LOCAL NAME | |
| 35 | 22 | 2 | 2 | 2.745099851665E+03 | 12 | 7127 | 87018500 | NW 215 ST (CR852) | |
| 36 | 34 | 2 | 2 | 3.215142044264E+01 | 13 | 1066 | 86000093 | SW 62TH AVE | |
| 42 | 37 | 2 | 2 | 3.621598882642E+01 | 14 | 1503 | 86470000 | FLORIDA'S TURNPIKE | |
| 46 | 47 | 2 | 2 | 1.479969002744E+02 | 15 | 1543 | 86471127 | | |
| 49 | 31 | 2 | 2 | 4.079165656133E-03 | 16 | 6812 | 87018000 | NW 215 ST/CO LINE RD | |
| 50 | 45 | 2 | 2 | 3.247699994581E+01 | 17 | 1498 | 86220000 | UNIVERSITY DRIVE | |
| 43 | 44 | 2 | 2 | 2.843803645954E-02 | 18 | 6945 | 87470111 | | |
| 38 | 51 | 2 | 2 | 2.099253882422E+02 | 19 | 6944 | 87470110 | | |
| 55 | 53 | 2 | 2 | 2.922172498860E+02 | 20 | 1546 | 86471130 | PALM AVE/SW 101 AVE | |
| 39 | 54 | 2 | 2 | 2.537376403612E-01 | 21 | 1229 | 86004000 | | |
| 59 | 57 | 2 | 2 | 4.171375263912E-02 | 22 | 6942 | 87470005 | | |
| 28 | 62 | 2 | 2 | 1.449326763601E-03 | 23 | 6604 | 87000169 | NE 203 ST | |
| 64 | 63 | 2 | 2 | 3.814519979555E-03 | 24 | 6667 | 87000253 | NW 207 ST | |
| 65 | 67 | 2 | 2 | 2.747148652542E-03 | 25 | 6681 | 87000267 | NW 207 ST | |
| 60 | 68 | 2 | 2 | 7.879327334309E-03 | 26 | 6700 | 87000298 | AVENTURA BLVD | |
| 4 | 70 | 2 | 2 | 1.867587405094E-03 | 27 | 6668 | 87000254 | NW 7 AVE | |
| 73 | 72 | 2 | 2 | 2.030870989477E-03 | 28 | 6665 | 87000250 | N BAY DR | |
| 76 | 69 | 2 | 2 | 6.004922602709E-02 | 29 | 6940 | 87470003 | | |
| 58 | 74 | 2 | 2 | 4.429076244300E-02 | 30 | 6941 | 87470004 | | |
| 11 | 77 | 2 | 2 | 9.050740400283E-02 | 31 | 7194 | 87000314 | NE 2 AVE | |
| 61 | 80 | 2 | 2 | 2.072800047414E-03 | 32 | 7038 | 87550505 | W DIXIE HWY | |
| 23 | 82 | 2 | 2 | 4.635746675165E-03 | 33 | 6808 | 87013000 | NW 199 ST | |
| | 85 | 2 | 2 | 2.066420439762E-03 | 34 | 6659 | 87000255 | NE 12 AVE | |

FIG. 6C

COMPOSITION OF RASTER AND VECTOR GRAPHICS IN GEOGRAPHIC INFORMATION SYSTEMS

FIELD OF THE INVENTION

The present invention relates to geographical information systems (GIS), and in particular to vector and raster GIS images.

BACKGROUND OF THE INVENTION

Conventional digital images are represented in either vector or raster formats. Vector formats are used to store lists of vector primitives, which may overlap and obscure or partially obscure one another. The vector primitives themselves generally consist of geometrical primitives including points, curves and areas. Points and curves generally have colors associated therewith, and areas generally have both a fill color and a boundary color. Curves include inter alia lines, pieced together line segments, circles, ellipses and Bezier curves. Graphics software generally provides tools for generating such curves.

Vector primitives are resolution independent, and can be scaled to any desired display screen. Thus a line or a circle, for example, can be rendered within an arbitrary display region by locating the endpoints of the line or the center and radius of the circle, and then rendering the line or the circle accordingly.

Familiar examples of vector images include flowcharts, block diagrams and other synthetic images produced by graphics software applications.

Raster formats are used to store arrays of pixel color values, the color values specifying a color for each pixel location within a rectangular array of pixels. Raster images are generally resolution dependent, and the information in a raster image file only suffices to identify color values for a fixed resolution. Raster images can be scaled down in size by down-sampling such as by averaging, and scaled up by up-sampling such as by interpolation. However, up-sampled color values in general are artificial, and often destroy the true nature of an image.

Familiar examples of raster images include image images acquired by a digital camera or scanner.

Image compositing involves generation of complex images by overlaying simpler images on top of one another. For example, a composite image may include a layer for a background, layers for various sprites, and a layer for text. Layers are generally arranged one on top of another. Each layer may obscure or partially obscure layers below it, or may be transparent and allow the lower layers to appear through it. Image compositing software applications generally enable a user to apply a variety of versatile editing effects to a composite image. Thus a user may edit each of the layers, add or remove layers, navigate through a composite image by zooming in and out and moving up, down, left and right, rotate and scale a composite image, apply brush strokes and other artistic effects, and apply image processing filters including calorimetric and geometrical transformations.

One of the many challenges of image compositing is the overlaying of raster and vector images. Since vector images are generally resolution independent, conventional digital compositing systems scale a vector image to the pixel dimensions of a raster image, when overlaying one upon the other.

In geographic information systems (GIS), image formats are used to represent maps of portions of the surface of the Earth. Such portions are three-dimensional in nature, and are generally projected onto a two-dimensional view plane for rendering. Coordinates of vector objects and of pixel locations are not arbitrarily set in GIS images, but correspond to locations of points on the surface of the Earth. As such, compositing of vector and raster GIS images poses additional alignment challenges, beyond those of conventional compositing. Further challenges arise with editing of such composite vector+raster GIS images.

Conventional digital image applications provide only limited viewing capability for composite vector+raster GIS images, and do not provide editing capability therefor.

There is thus a need for an image processing method and system that enables versatile editing of composite vector+raster GIS images.

SUMMARY OF THE INVENTION

The present invention provides a method and system for compositing vector and raster GIS images as layers of a composite image, and for editing the resultant composite vector+raster image. Using the present invention, software or hardware or a combination of software and hardware can be manufactured to enable a user to import vector GIS images and raster GIS images into a composite image, and maintain accurate geographical alignment therebetween. The user can modify the composite vector+raster image in many ways, including inter alia
- applying opacity masks;
- importing non-GIS layers such as text and brush strokes;
- applying image processing filters such as sharpening and blurring filters;
- applying geometrical transformations such as scaling, rotation and reflection;
- applying calorimetric transformations such as visualization tools; and
- magnifying a portion of the composite image within a desired lens-shaped region.

There is thus provided in accordance with a preferred embodiment of the present invention a method for editing composite geographical images, including importing a raster geographical map file, the raster file including geographical information identifying raster image data, global positioning reference data and a first projection that transforms geographical coordinates to linear coordinates, importing a vector geographical map file, the vector file including geographical information identifying vector objects, rendering a two-dimensional raster image including transforming linear coordinates to geographical coordinates according to the inverse of a prescribed second projection that transforms geographical coordinates to linear coordinates, and re-projecting the geographical coordinates to linear coordinates according to the first projection, rendering a two-dimensional vector image including projecting the vector objects according to the prescribed second projection, compositing the two-dimensional image raster image and the two-dimensional vector image as layers of a composite image, and editing the composite image.

There is further provided in accordance with a preferred embodiment of the present invention a GIS system for editing composite geographical images, including a raster image file adaptor, for importing a geographical map file, the file including geographical information identifying raster image data, global positioning reference data and a first projection that transforms geographical coordinates to linear coordinates, a vector image file adaptor, for importing a geographical map file, the file including geographical information identifying vector objects, a raster map projector operatively coupled to the raster image file adaptor for transforming linear coordinates to geographical coordinates using the inverse of a prescribed second projection that transforms geographical coordinates to linear coordinates, and for projecting geographical coordinates to linear coordinates using the first projection, a vector map projector operatively coupled to the vector image file adaptor for projecting vector objects to a two-dimensional vector image, using the prescribed second projection, and an image editor operatively coupled to the raster map projector and the vector map projector for compositing a two-dimensional raster image and a two-dimensional vector image as layers of a composite image, and for editing the composite image.

There is yet further provided in accordance with a preferred embodiment of the present invention a method for editing composite geographical images, including importing a raster geographical map file, the raster file including geographical information identifying raster image data, global positioning reference data and a first projection that transforms geographical coordinates to linear coordinates, importing a vector geographical map file, the vector file including two-dimensional vector objects corresponding to a second projection, rendering a two-dimensional raster image including transforming linear coordinates to geographical coordinates according to the inverse of the second projection that transforms geographical coordinates to linear coordinates, and re-projecting the geographical coordinates to linear coordinates according to the first projection, rendering a two-dimensional vector image comprising rasterizing the two-dimensional vector objects, compositing the two-dimensional image raster image and the two-dimensional vector image as layers of a composite image, and editing the composite image.

There is moreover provided in accordance with a preferred embodiment of the present invention a GIS system for editing composite geographical images, including a raster image file adaptor, for importing a geographical map file, the file including geographical information identifying raster image data, global positioning reference data and a first projection that transforms geographical coordinates to linear coordinates, a vector image file adaptor, for importing a geographical map file, the file including two-dimensional vector objects corresponding to a second projection, a raster map projector operatively coupled to the raster image file adaptor for transforming linear coordinates to geographical coordinates including an inverse projector for transforming geographical coordinates to linear coordinates according to the inverse of a prescribed second projection, and a forward projector for projecting geographical coordinates to linear coordinates, according to the first projection, a vector map rasterizer operatively coupled to the vector image file adaptor for rasterizing two-dimensional vector objects, and an image editor operatively coupled to the raster map projector and the vector map projector including an image compositor for compositing a two-dimensional raster image and a two-dimensional vector image as layers of a composite image, and an image editor for editing the composite image.

There is additionally provided in accordance with a preferred embodiment of the present invention a method for editing composite geographical images, including importing a raster geographical map file, the raster file including a two-dimensional raster image, global positioning reference data and a first projection that transforms geographical coordinates to linear coordinates, importing a vector geographical map file, the vector file including information identifying two-dimensional vector objects, rendering a two-dimensional vector image including inverse projecting the two-dimensional vector objects according to a prescribed second projection, projecting the resulting inverse-projected vector objects according to the first projection, compositing the two-dimensional image raster image and the two-dimensional vector image as layers of a composite image, and editing the composite image.

There is further provided in accordance with a preferred embodiment of the present invention a GIS system for editing composite geographical images, including a raster image file adaptor, for importing a geographical map file, the file including a two-dimensional raster image, global positioning reference data and a first projection that transforms geographical coordinates to linear coordinates, a vector image file adaptor, for importing a geographical map file, the file including information identifying two-dimensional vector objects, a vector map projector operatively coupled to the vector image file adaptor including an inverse projector for inverse projecting the two-dimensional vector objects according to a prescribed second projection, and a forward vector projector for projecting the resulting inverse-projected vector objects according to the first projection, and an image editor operatively coupled to the raster map projector and the vector map projector including an image compositor for compositing a two-dimensional raster image and a two-dimensional vector image as layers of a composite image, and an image editor for editing the composite image.

There is yet further provided in accordance with a preferred embodiment of the present invention a method for editing composite geographical images, including importing a raster geographical map file, the raster file including geographical information identifying raster image data and global positioning reference data, importing a vector geographical map file, the vector file including geographical information identifying vector objects with globally positioned edit paths, aligning the raster image data and the vector objects so that the global positioning reference data and the globally positioned edit paths are in alignment, compositing the aligned raster image data and vector objects as layers of a composite image, and editing the composite image.

There is moreover provided in accordance with a preferred embodiment of the present invention a GIS system for editing composite geographical images, including a raster image file adaptor for importing a raster geographical map file, the raster file including geographical information identifying raster image data and global positioning reference data, a vector image file adaptor for importing a vector geographical map file, the vector file including geographical information identifying vector objects with globally positioned edit paths, a global position aligner operatively coupled with the raster image file adaptor and the vector image file adaptor, for aligning the raster image data and the vector objects so that the global positioning reference data and the globally positioned edit paths are in alignment, and an image processor operatively coupled with the global position aligner, for compositing the aligned raster image data and vector objects as layers of a composite image, and for editing the resulting composite image.

There is additionally provided in accordance with a preferred embodiment of the present invention a computer-readable storage medium storing program code for causing a computer to perform the steps of importing a raster geographical map file, the raster file including geographical information identifying raster image data, global positioning reference data and a first projection that transforms geographical coordinates to linear coordinates, importing a vector geographical map file, the vector file including geographical information identifying vector objects, rendering a two-dimensional raster image including transforming linear coordinates to geographical coordinates according to the inverse of a prescribed second projection that transforms geographical coordinates to linear coordinates, and re-projecting the geographical coordinates to linear coordinates according to the first projection, rendering a two-dimensional vector image including projecting the vector objects according to the prescribed second projection, compositing the two-dimensional image raster image and the two-dimensional vector image as layers of a composite image, and editing the composite image.

There is additionally provided in accordance with a preferred embodiment of the present invention a computer-readable storage medium storing program code for causing a computer to perform the steps of importing a raster geographical map file, the raster file including geographical information identifying raster image data, global positioning reference data and a first projection that transforms geographical coordinates to linear coordinates, importing a vector geographical map file, the vector file including two-dimensional vector objects corresponding to a second projection, rendering a two-dimensional raster image including transforming linear coordinates to geographical coordinates according to the inverse of the second projection that transforms geographical coordinates to linear coordinates, and re-projecting the geographical coordinates to linear coordinates according to the first projection, rendering a two-dimensional vector image comprising rasterizing the two-dimensional vector objects, compositing the two-dimensional image raster image and the two-dimensional vector image as layers of a composite image, and editing the composite image.

There is additionally provided in accordance with a preferred embodiment of the present invention a computer-readable storage medium storing program code for causing a computer to perform the steps of importing a raster geographical map file, the raster file including a two-dimensional raster image, global positioning reference data and a first projection that transforms geographical coordinates to linear coordinates, importing a vector geographical map file, the vector file including information identifying two-dimensional vector objects, rendering a two-dimensional vector image including inverse projecting the two-dimensional vector objects according to a prescribed second projection, projecting the resulting inverse-projected vector objects according to the first projection, compositing the two-dimensional image raster image and the two-dimensional vector image as layers of a composite image, and editing the composite image.

There is further provided in accordance with a preferred embodiment of the present invention a computer-readable storage medium storing program code for causing a computer to perform the steps of importing a raster geographical map file, the raster file including geographical information identifying raster image data and global positioning reference data, importing a vector geographical map file, the vector file including geographical information identifying vector objects with globally positioned edit paths, aligning the raster image data and the vector objects so that the global positioning reference data and the globally positioned edit paths are in alignment, compositing the aligned raster image data and vector objects as layers of a composite image, and editing the composite image.

BRIEF DESCRIPTION OF THE DRAWINGS

The present invention will be more fully understood and appreciated from the following detailed description, taken in conjunction with the drawings in which:

FIG. 5B is a simplified block diagram of a more versatile GIS system for editing composite raster and vector geographical images, in accordance with a preferred embodiment of the present invention.

DETAILED DESCRIPTION OF A PREFERRED EMBODIMENT

The present invention concerns composition of vector and raster graphics within geographical information systems (GIS). GIS images are generally of two types: vector images comprised of vector objects such as points, lines and areas, and raster images comprised of arrays of pixel color values.

The present invention is preferably implemented within a conventional computing device including a central processing unit, memory units for storing programs and data, input devices including a mouse and keyboard, and an output display device. Preferably, the central processing unit, memory units, and device drivers for the mouse, keyboard and display are coupled communicatively together using a conventional data bus. It may be appreciated, however, from the description hereinbelow, that the present invention may also be implemented within non-conventional computing devices, as long as such devices include processing means, program and data storage means, and input and display means that inter-communicate. The present invention can be implemented within a standalone computer, or within one or more networked computers.

Vector GIS Images

Figure 1A:
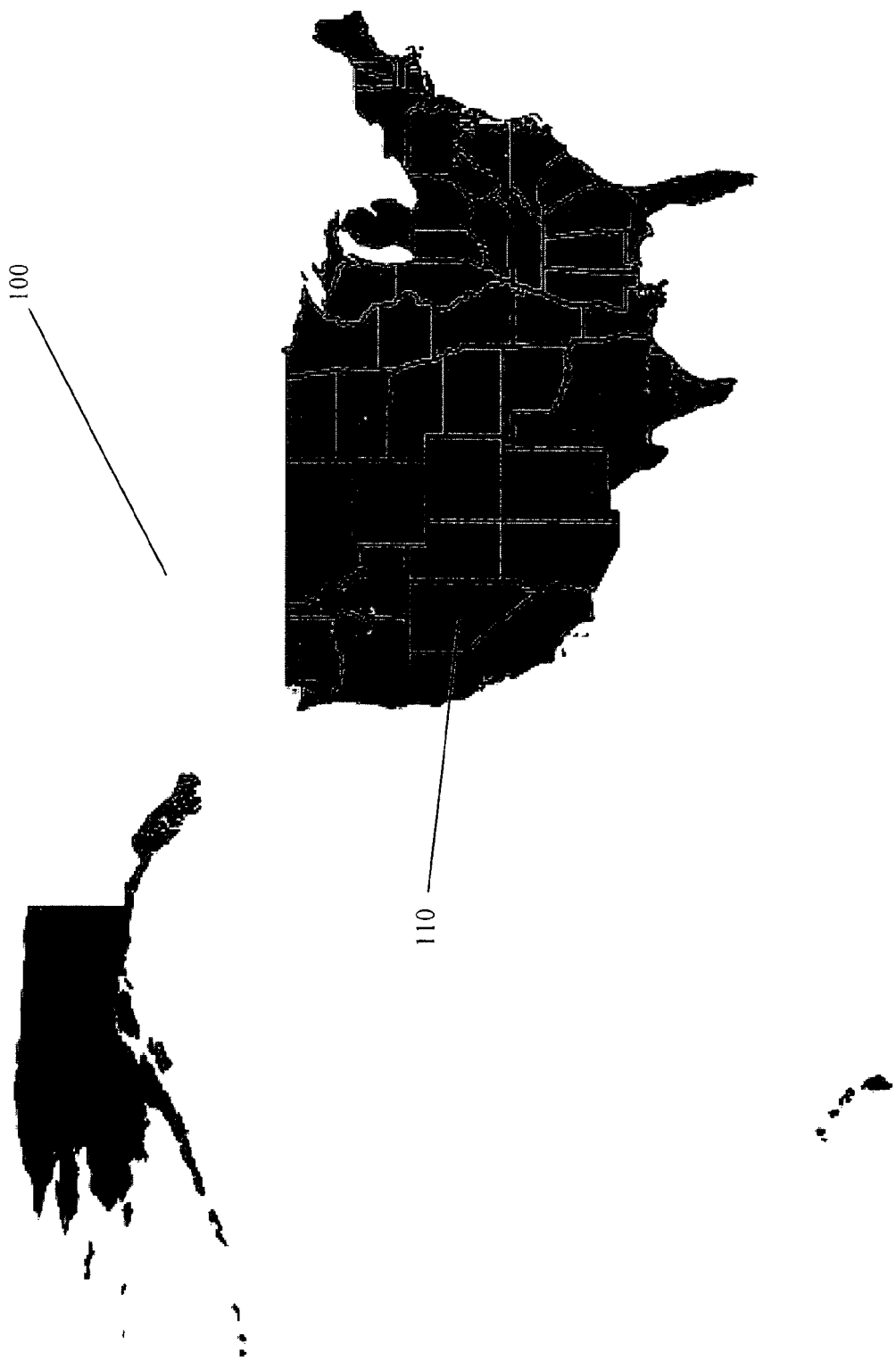
FIG. 1A is an illustrative vector image for the United States, corresponding to a vector image file.
Figure 1B:
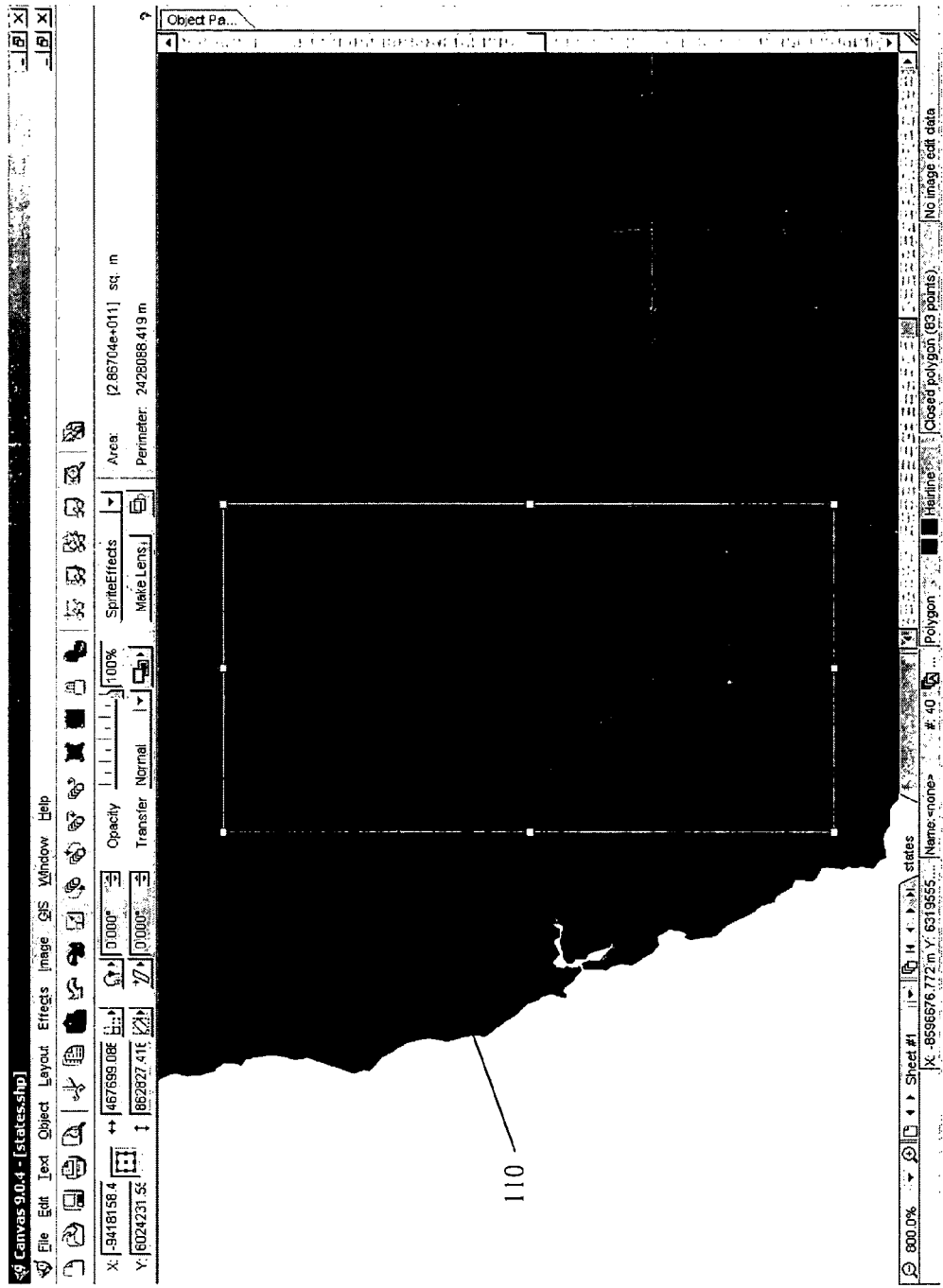
FIG. 1B is an expanded view of FIG. 1A showing the State of Nevada.
Figure 1C:
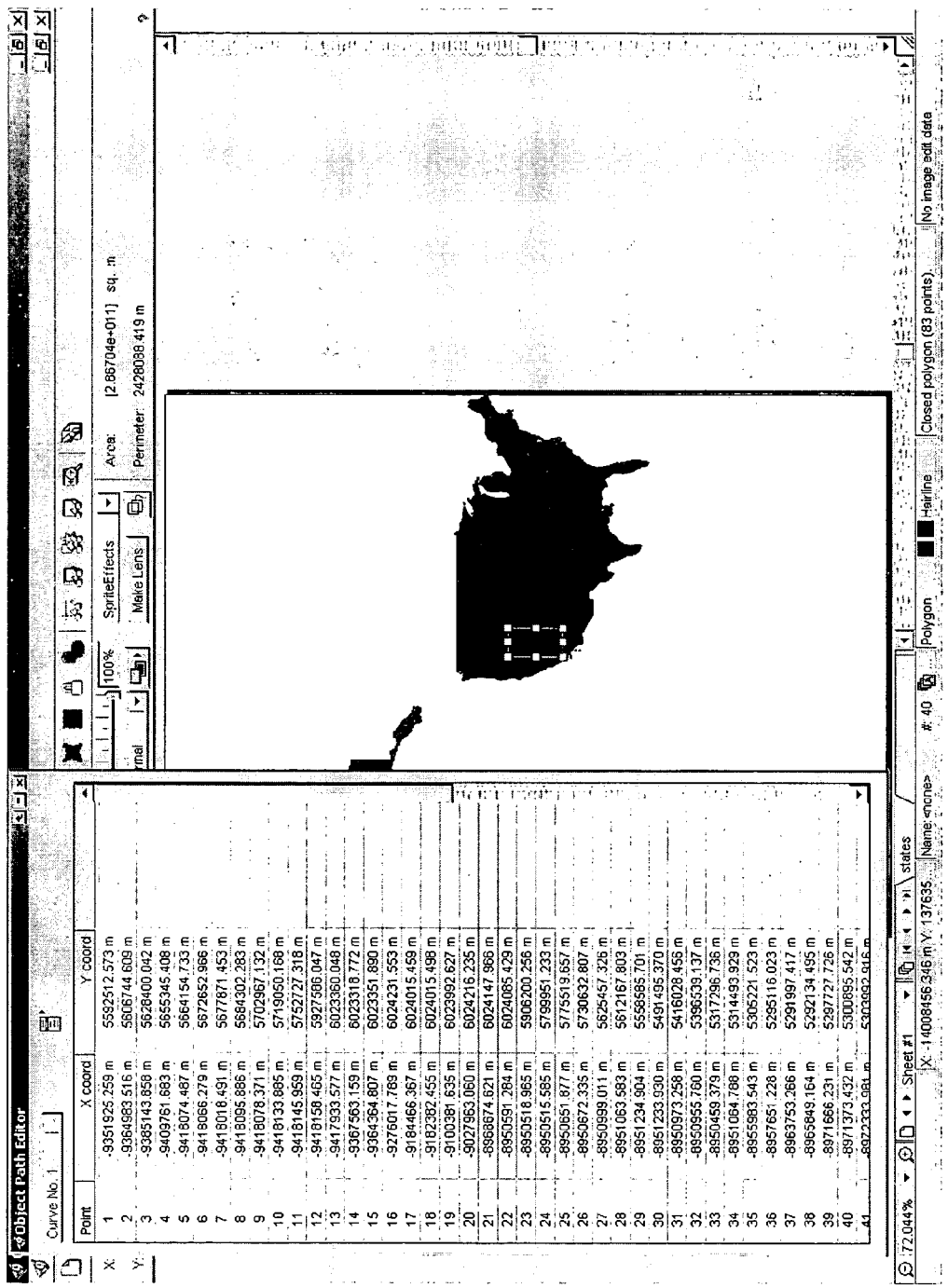
FIG. 1C is a portion of the edit path for the boundary of the State of Nevada illustrated in FIG. 1B.

Reference is now made to FIG. 1, which is an illustrative vector image for the United States, corresponding to a GIS shape file. The shape file rendered in FIG. 1 includes 51 polygonal objects, one polygon for each of the 50 states, and a polygon for the District of Columbia. Each polygon is represented as a piecewise linear path, referred to as an "edit path." The State of Nevada, for example, indicated by numeral 110 in FIG. 1A, is shown enlarged in FIG. 1B. As can be seen in FIG. 1B, the border of the State includes line segments connected one to another. The southeastern part of the border is rugged, and is represented by many short line segments. A total of 83 line segments are used to render the border of Nevada. Thus the edit path of Nevada includes 84 (x, y) coordinates, wherein the $84^{th}$ coordinate is the same of the $1^{st}$ coordinate, and the $n^{th}$ line segment connects the $n^{th}$ point with the $(n+1)^{st}$ point. FIG. 1C shows a portion of the edit path for the State of Nevada shown in FIG. 1B.

Each of the (x, y) coordinates, referred to as "global linear coordinates," used to represent borders of states, corresponds uniquely to a longitude and a latitude (θ, ϕ) on the surface of the Earth, referred to as "geographical coordinates." A projection, such as a stereographic projection, denoted by Π, is used to project coordinates on the surface of the Earth, (θ, ϕ), to coordinates in a plane, (x, y), referred to as global coordinates. That is, the projection transforms geographical coordinates to global linear coordinates; Π: (θ, ϕ)→(x, y).

Figure 2:
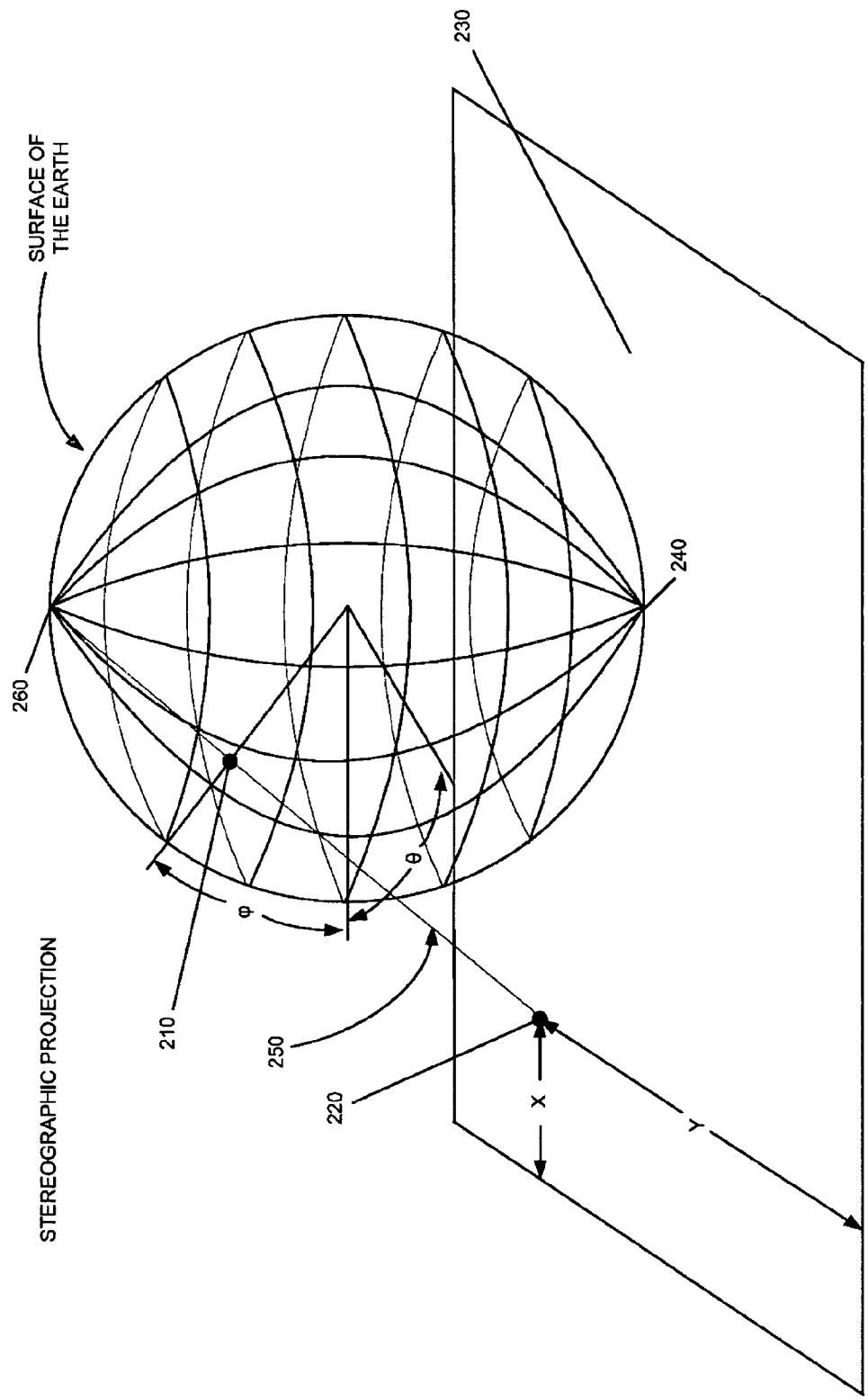
FIG. 2 is a simplified illustration of a projection from the surface of the Earth to a two-dimensional plane.

Reference is now made to FIG. 2, which is a simplified illustration of a projection from the surface of the Earth to a two-dimensional plane. The projection illustrated in FIG. 2 is a conventional stereographic azimuthal projection, which transforms each point 210 on the surface of the Earth to a unique point 220 on a plane 230 tangent to the Earth at the South Pole 240, the unique point 220 corresponding to the intersection of a line 250 connecting the North Pole 260 to the point 210 with the tangent plane 230. Point 210 with geographical coordinates (θ, ϕ) on the surface of the Earth is projected to point 220 with global linear coordinates (x, y).

Similarly, a scaling transformation, denoted by Σ, transforms global coordinates to local coordinates; Σ: (x, y)→(i, j). The local coordinates correspond to pixel coordinates within a view plane. Pixel data in the view plane is rendered on a display screen or printed onto a page of paper.

Generally, the local coordinates (i, j) span only a relatively small portion of the Earth, such as the United States or the State of Nevada. The local coordinates themselves form a rectangular array, since rendered maps are generally rectangular. However, the geographical coordinates corresponding to such rectangular array generally do not form a rectangular array, but instead are warped. Thus, if R denotes a rectangular region in (x, y) space, then $Π^1$ (R) is generally not a rectangular region in (θ, ϕ) space. The notation $Π^1$ denotes the inverse transformation to Π; i.e., referring to FIG. 2, the transformation that maps point 220 with global linear coordinates (x, y) back to point 210 with geographical coordinates (θ, ϕ).

The scaling transformation Σ generally loses global positioning information. That is, after global points (x, y) are scaled to local points (i, j), the local points cannot thereafter be scaled back to the global points. In order to retain the global positioning information two or more reference points are required, such as the global positions of two points (i1, j1) and (i2, j2), where i1≠i2 and j1≠j2.

Raster GIS Images

Figure 3A:
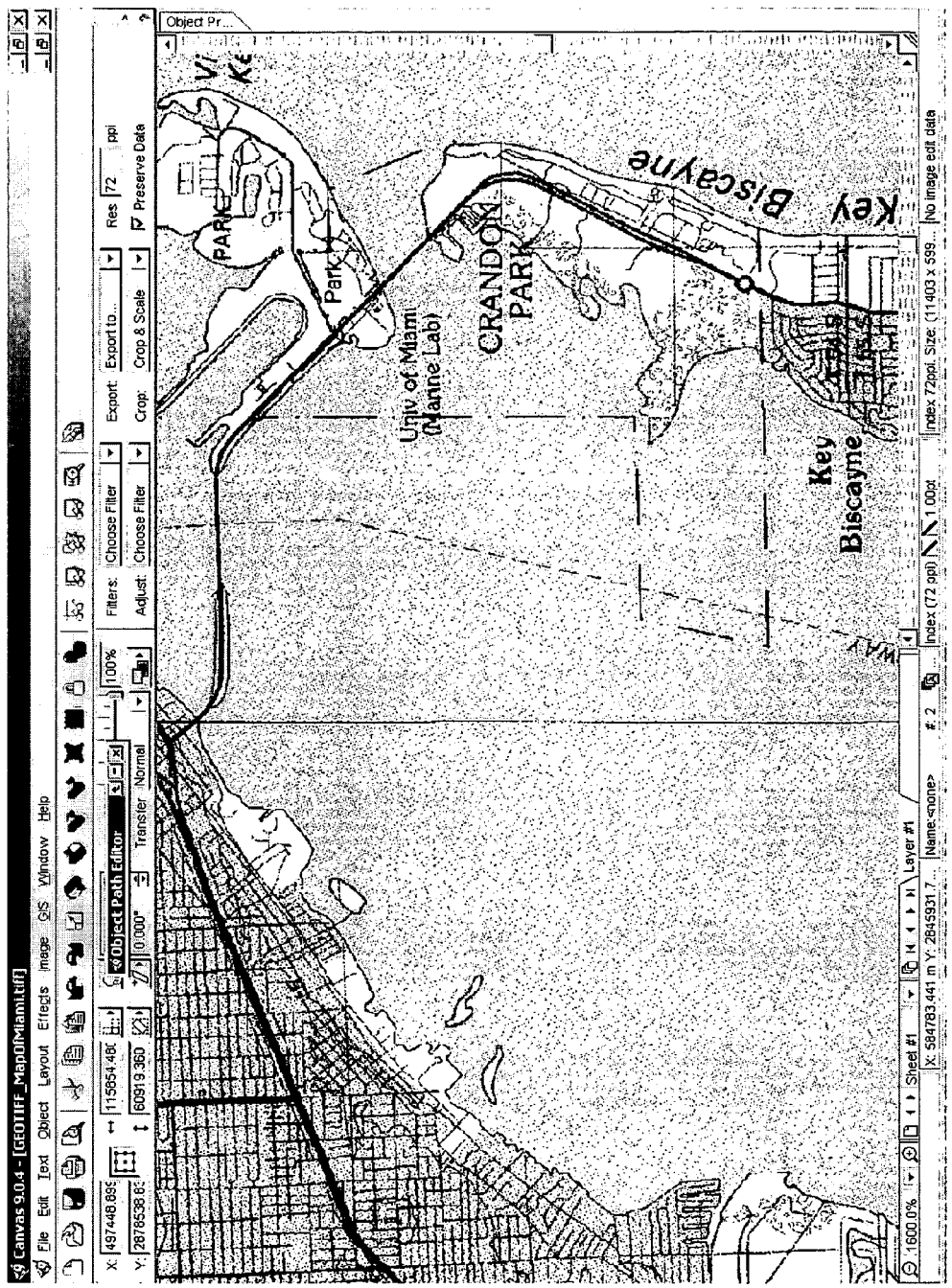
FIG. 3A is a raster image of a portion of the city of Miami, Fla., corresponding to a raster image file.

Shown in FIG. 3A is a raster image of a portion of the city of Miami, Fla., corresponding to a GEO-TIF file. The GEO-TIF file rendered in FIG. 3A contains pixel data c(i, j) for a rectangular array of pixel locations (i, j), where c denotes a color vector, such as a three-dimensional RGB color, c(i, j)=(r(i, j), j), b(i, j)), where r, g and b are 8-bit integers. Thus, a GEO-TIF image corresponds to an already projected portion on the surface of the Earth. Generally, a GEO-TIF file includes (i) a description of the projection used to transform geographical coordinates to global linear coordinates; and (ii) reference point information for at least two local points (i, j).

Figure 3B:
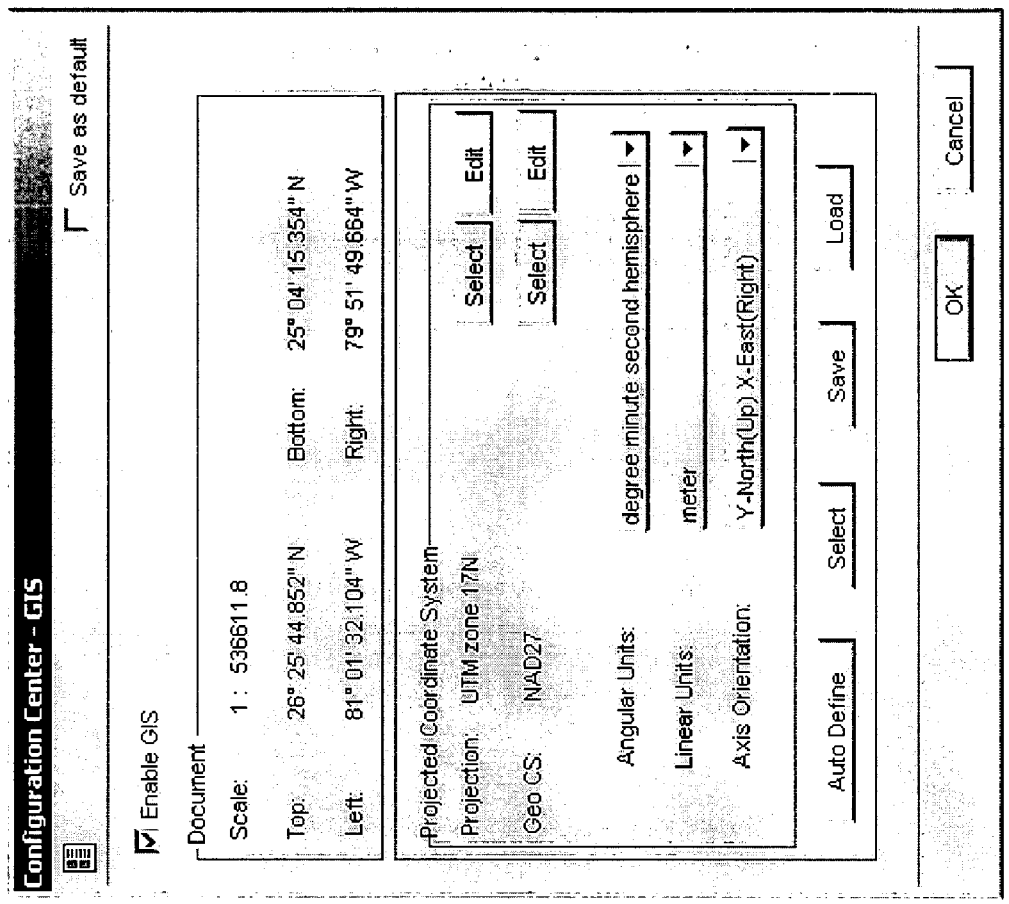
FIG. 3B is an information panel for the image in FIG. 3A.

Shown in FIG. 3B is an information panel for the image in FIG. 3A. As shown in the panel, the projection used for rendering the map in FIG. 3A is "UTM Zone 17N"; and the reference point information specifies the top-most latitude of FIG. 2A as 26° 25' 44.852" N, the bottom-most latitude as 25° 4' 15.354" N, the left-most longitude as 81° 1' 32.104" W and the right-most longitude as 79° 51' 49.664" W. Using the given projection and the given reference information, the local coordinates for the map of Miami can be converted back to geographical coordinates.

Composite Vector+Raster GIS Images

It may thus be appreciated that shape files and GEO-TIF files represent two general types of map formats for geographical images—vector and raster. Shape file data may correspond to geographical coordinates or global linear coordinates, and GEO-TIF file data generally corresponds to local linear coordinates. As such, overlaying vector maps and raster maps in such a way that the resulting composite image can be further edited, is difficult.

In a preferred embodiment, the present invention overcomes the difficulty of editing composite images having both vector and raster layers, by warping the layers one to another. Specifically, the layers are referred to a common projection, so that they can be overlaid while maintaining geographical alignment. Thus, if a GEO-TIF file specifies a first projection, $Π_1$, and if a shape file specified in terms of geographical coordinates is to be rendered using a second projection, $Π_2$, and a scaling transformation Σ, then the pixel coordinates of the GEO-TIF file are mapped to transformed coordinates by applying $Π_1\ Π_2^{-1}\ Σ^1$: (i2, j2)→(i1, j1). The color value of pixel (i1, j1) for the GEO-TIF image is assigned to pixel (i2, j2) for the composite image. The composite image can then be interactively edited.

Figure 4:
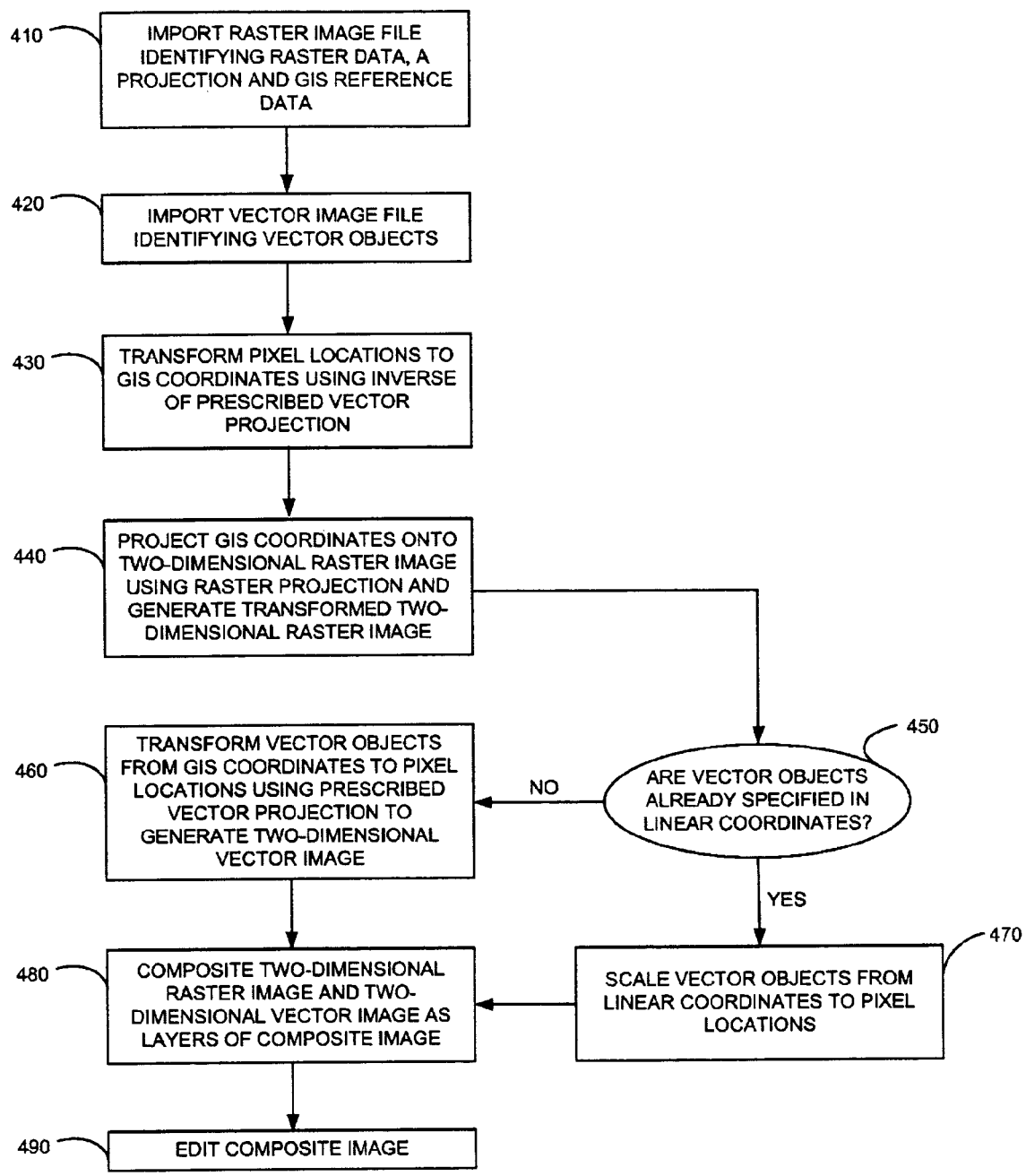
FIG. 4 is simplified flowchart of a method for editing composite raster and vector geographical images, in accordance with a preferred embodiment of the present invention.

Reference is now made to FIG. 4, which is a simplified flowchart of a method for editing composite raster and vector geographical images, in accordance with a preferred embodiment of the present invention. At step 410 a raster image file is imported, such as a GEO-TIF file. Preferably, the raster image file identifies raster image data, a first projection from the surface of the Earth to a two-dimensional plane, and reference GIS positioning data. At step 420 a vector image file is imported, such as a shape file, specified in terms of geographical coordinates or in terms of linear coordinates. Preferably, the vector image file identifies vector objects, such as points, curves and areas, using GIS coordinates for edit paths. At step 430 pixel locations for a to-be-transformed raster image within a display plane are inverse projected to GIS coordinates, using the inverse of a prescribed second projection. At step 440 the GIS coordinates are projected to linear coordinates within the raster image data, using the first projection from the surface of the Earth to a two-dimensional view plane.

The color value at the linear coordinates within the raster image data is then assigned to the pixel locations of the to-be-transformed image, thereby generating the modified raster image. The modified raster image corresponds to the original raster image based on the second projection instead of the first projection.

At step 450 a determination is made as to whether the vector objects are already specified in terms of linear coordinates within the vector image file. If not, then at step 460 the vector objects are projected to a two-dimensional vector image, using the prescribed second projection from the surface of the Earth to the two-dimensional view plane, thus generating a two-dimensional vector image. If so, then at step 470 the vector objects only require scaling from global linear coordinates to local linear coordinates, in order to generate the two-dimensional vector image.

At step 480 the two-dimensional raster image and the two-dimensional vector image are composited as layers of a composite image. Finally, at step 490 the composite image is edited.

Figure 5A:
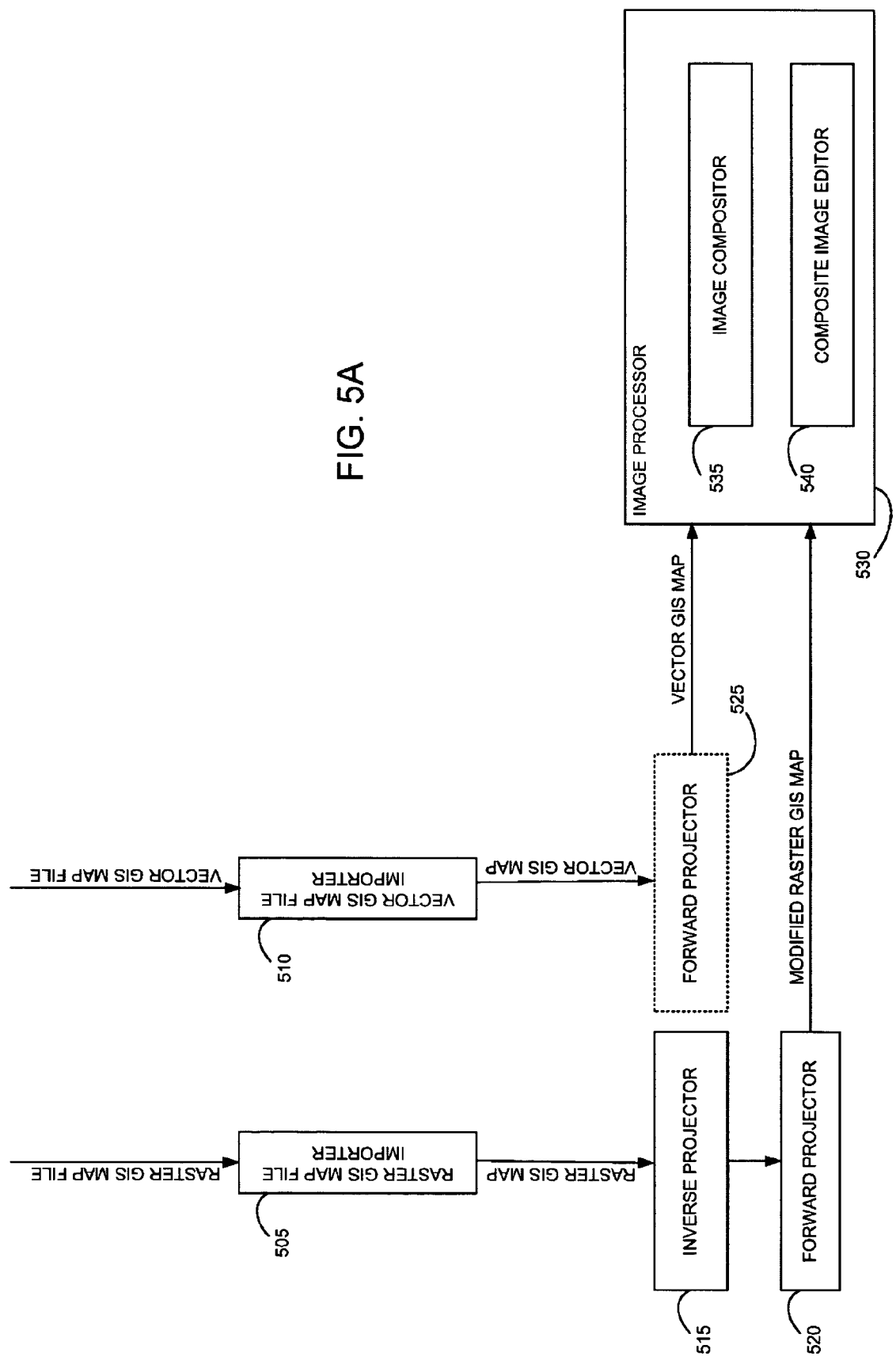
FIG. 5A is a simplified block diagram of a GIS system for editing composite raster and vector geographical images, in accordance with a preferred embodiment of the present invention.

Reference is now made to FIG. 5A, which is a simplified block diagram of a GIS system for editing composite raster and vector geographical images, in accordance with a preferred embodiment of the present invention. Shown in FIG. 5 is a raster GIS map file importer 505, which reads a raster GIS map file and generates raster image data therefrom. Preferably, GIS map file importer 505 also identifies a first projection associated with the raster image data, and reference GIS positioning information also associated with the raster image data. Similarly, a vector GIS map file importer 510 reads a vector GIS map file and generates vector data therefrom. Preferably, vector GIS map file importer 510 identifies vector objects such as points, curves and areas, specified using either GIS or linear coordinates.

In accordance with a preferred embodiment of the present invention, the raster map data identified by raster GIS map file importer 505 is transformed to modified raster map data, by an inverse projector 515 that inverts raster pixel coordinates within a view plane to GIS coordinates using the inverse of a specified second projection, followed by a forward image projector 520 that projects the GIS coordinates to modified pixel coordinates using a prescribed vector projection. That is, using the notation hereinabove, inverse raster image projector 515 applies the transformation $\Pi_2^{-1}\Sigma^1: (i2, j2) \rightarrow (\theta, \phi)$, and forward projector 520 applies the transformation $\Pi_1: (\theta, \phi) \rightarrow (i1, j1)$. Modified raster map data is generated by assigning color values at location (i1, j1) from the imported raster map data to location (i2, j2) for the modified raster data.

The modified raster map data corresponds to a two-dimensional raster image within the view plane.

Similarly, a forward projector 525 projects the vector objects onto the view plane using the prescribed vector projection, to generate a two-dimensional vector image within the view plane. Forward projector 525 is drawn using dotted lines, to indicate that it is required if the vector GIS map file is specified in terms of GIS coordinates, and is not required if the vector GIS map file is specified in terms of linear coordinates.

The two-dimensional raster image and the two-dimensional vector image are transmitted to an image processor 530. Image processor 530 includes an image compositor 535 that composites the two two-dimensional images as layers of a composite vector+raster image, and a composite image editor 540 that edits the resulting composite image. The composite vector+raster image is aligned so that vector objects are displayed at their correct locations within the raster image.

Reference is now made to FIG. 5B, which is a simplified block diagram of a more versatile GIS system for editing composite raster and vector geographical images, in accordance with a preferred embodiment of the present invention. The system shown in FIG. 5B is flexible enough to accommodate a scenario in which both a raster GIS map file and a vector GIS map file are re-projected using a third projection. That is, the raster GIS map data is based on a first projection, the vector GIS map data is specified in linear coordinates based on a second projection, and the composite image is to be rendered using yet a third projection. This situation can arise, for example, when three or more map files are composited.

In general, if n map files, $F_1, F_2, \ldots, F_n$ correspond to respective projections $P_1, P_2, \ldots, P_n$, and if a composite target image is to be rendered with respect to a projection P, then the map data in each file $F_i$ is inverse projected using projection $P_i$ and then forward projected using projection P. Thus, as shown in FIG. 5B, both the raster map data and the vector map data are inverse projected back to geographical coordinates, using respective modules 515 and 545, and then projected forward to linear coordinates with the third projection, using module 525. Modules 525 and 545 are shown in dotted lines, indicating that one or both of them may not be required, as in the simpler system shown in FIG. 5A.

Moreover, as shown in FIG. 5B, modules 550 and 555 for change of GIS coordinates are operative to convert geographical data from one geographical coordinate system to another. It may be appreciated that multiple geographical coordinates systems exist for the surface of the Earth. The raster map data and vector map data may correspond to different geographical coordinate systems. Modules 550 and 555 are shown in dotted lines, since they may not be required.

Figure 6A:
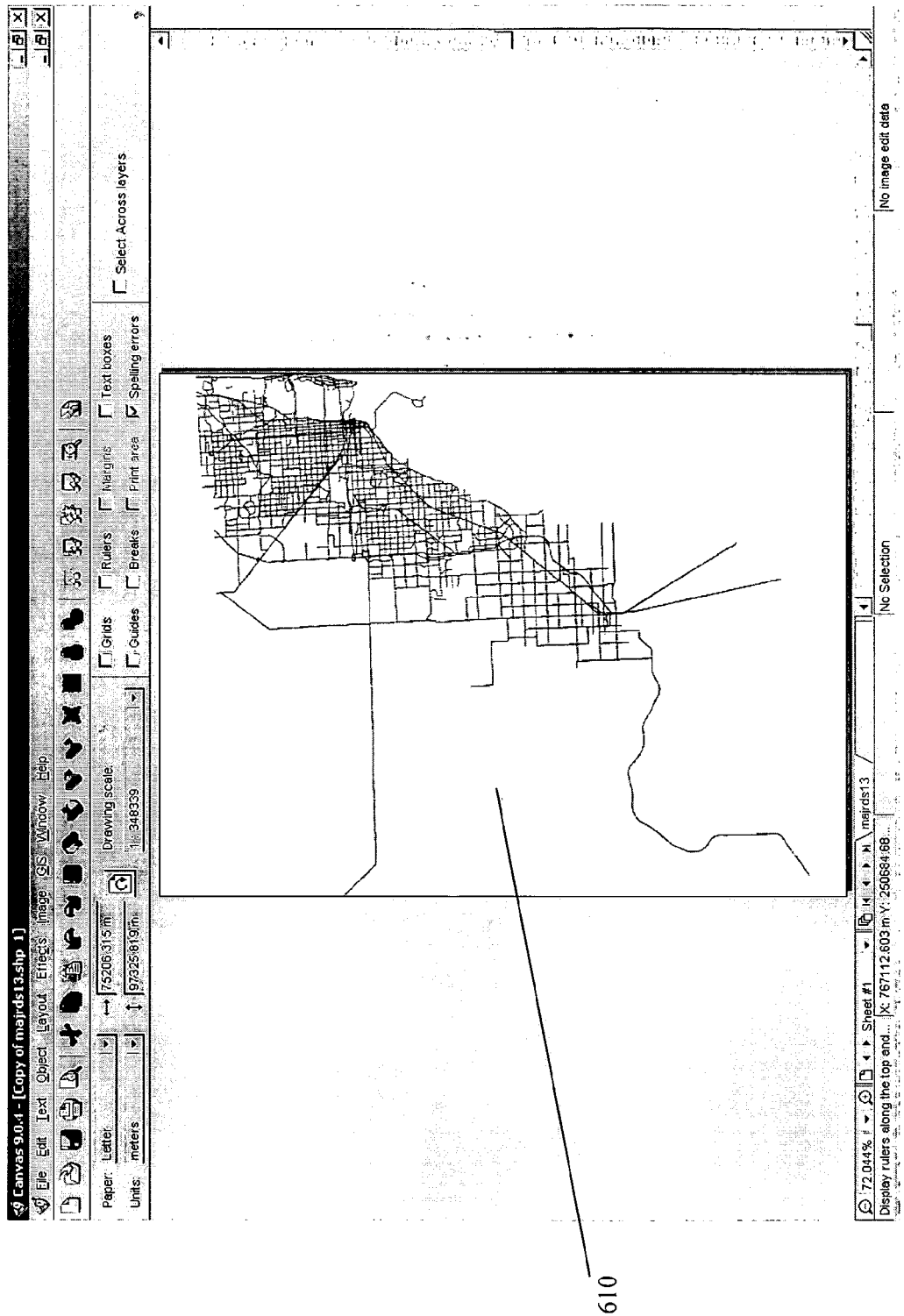
FIGS. 6A-6N are views of a composite GIS image including a vector layer and a raster layer, processed in accordance with a preferred embodiment of the present invention.
Figure 6B:
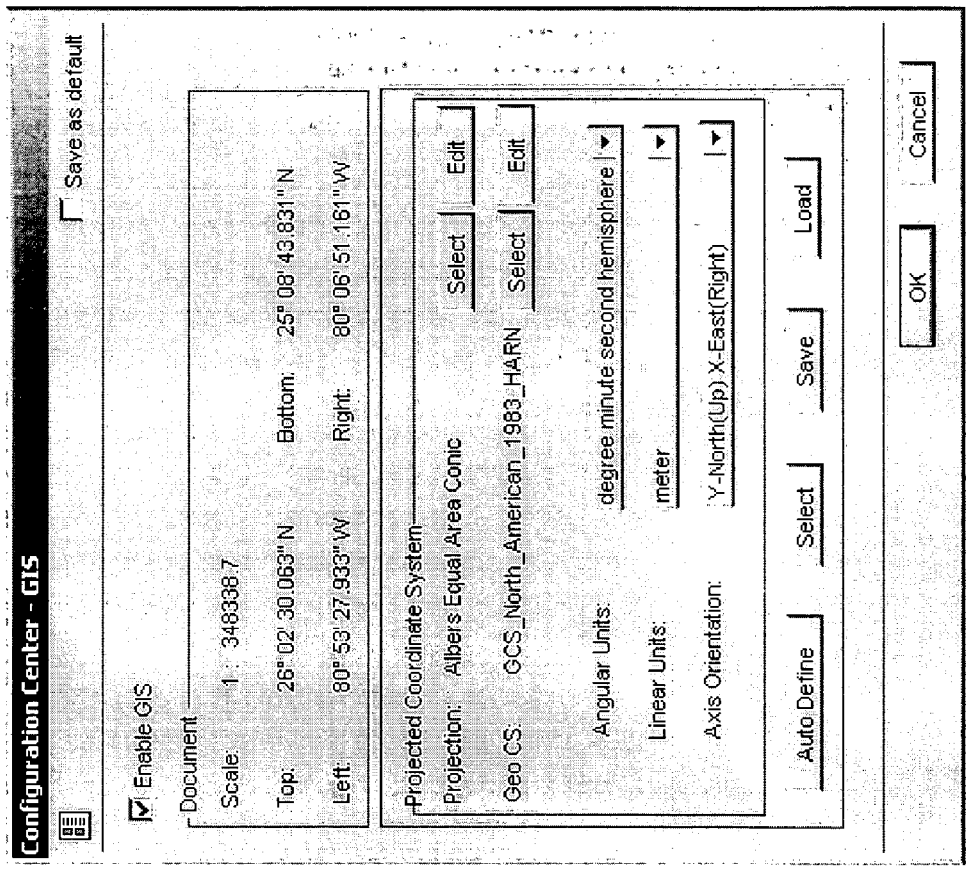
Figure 6D:
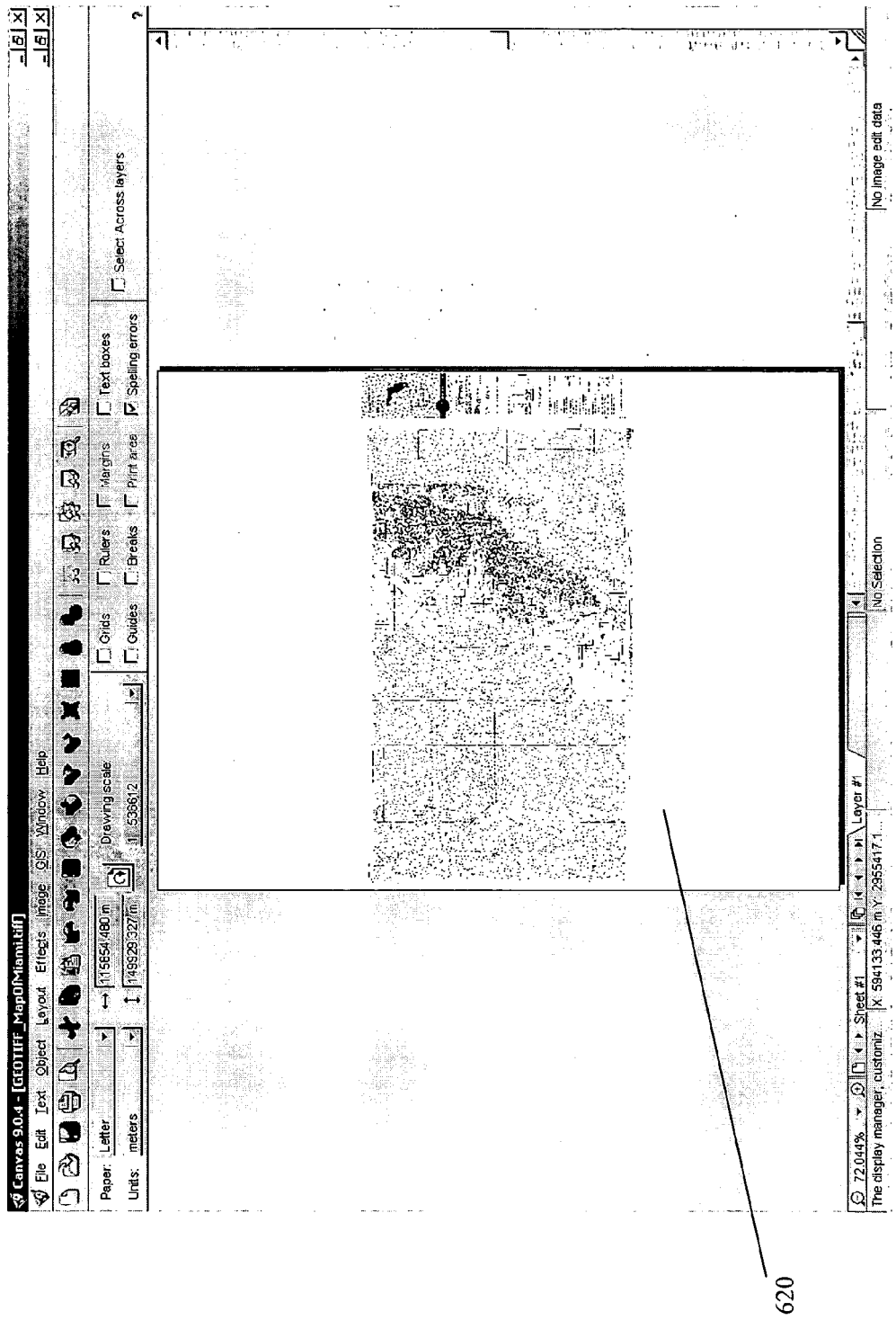
Figure 6E:
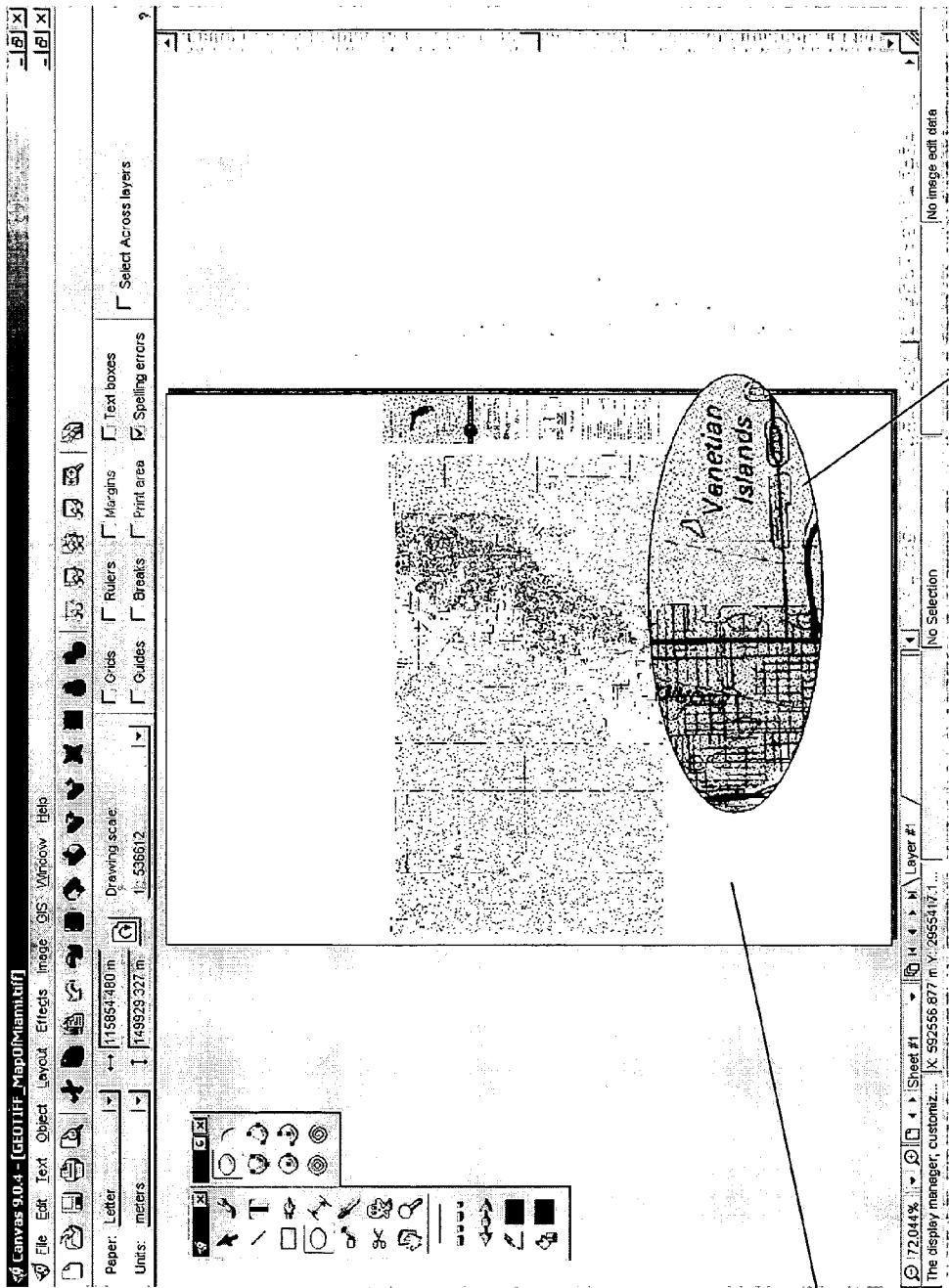
Figure 6F:
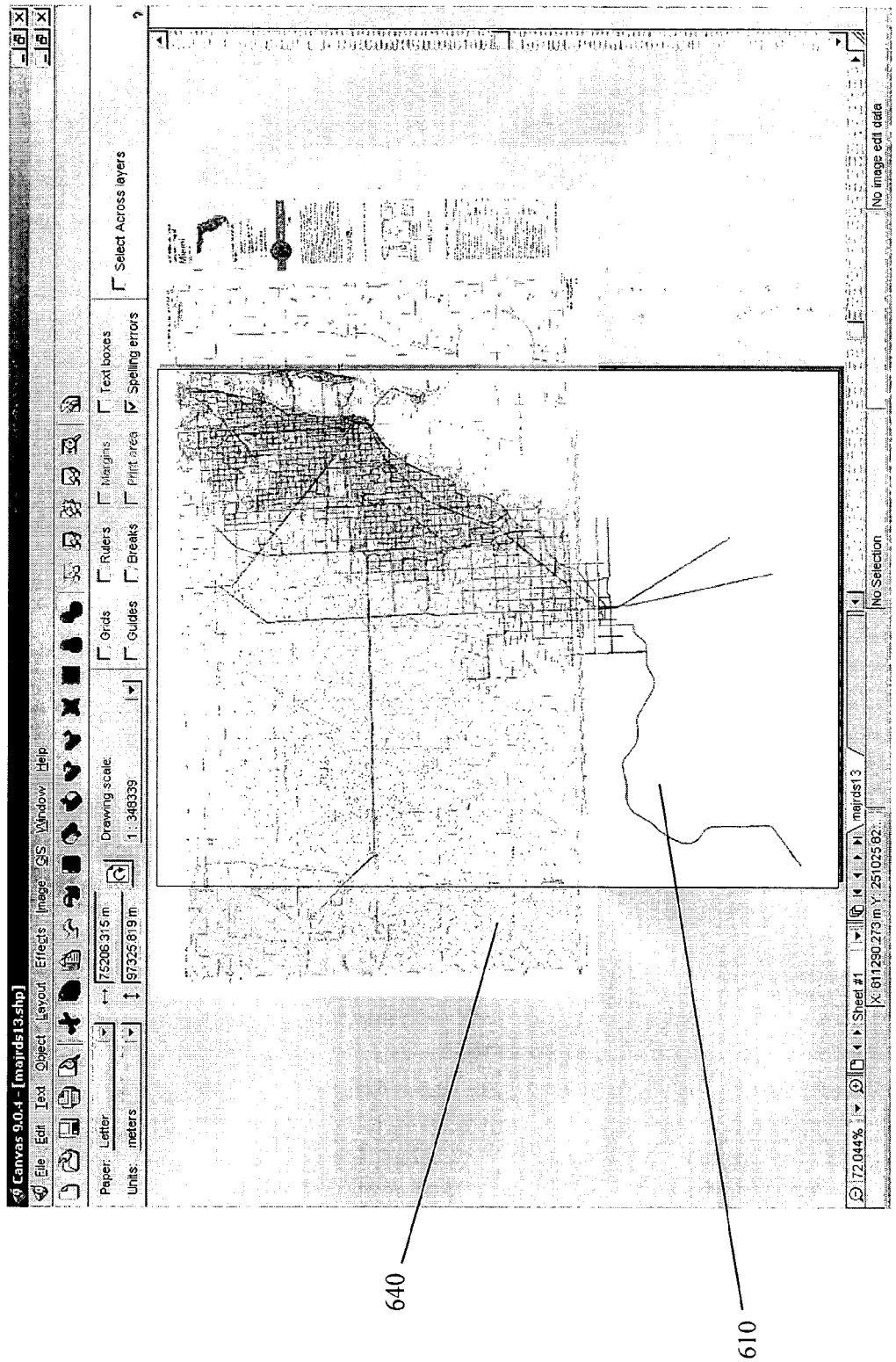
Figure 6G:
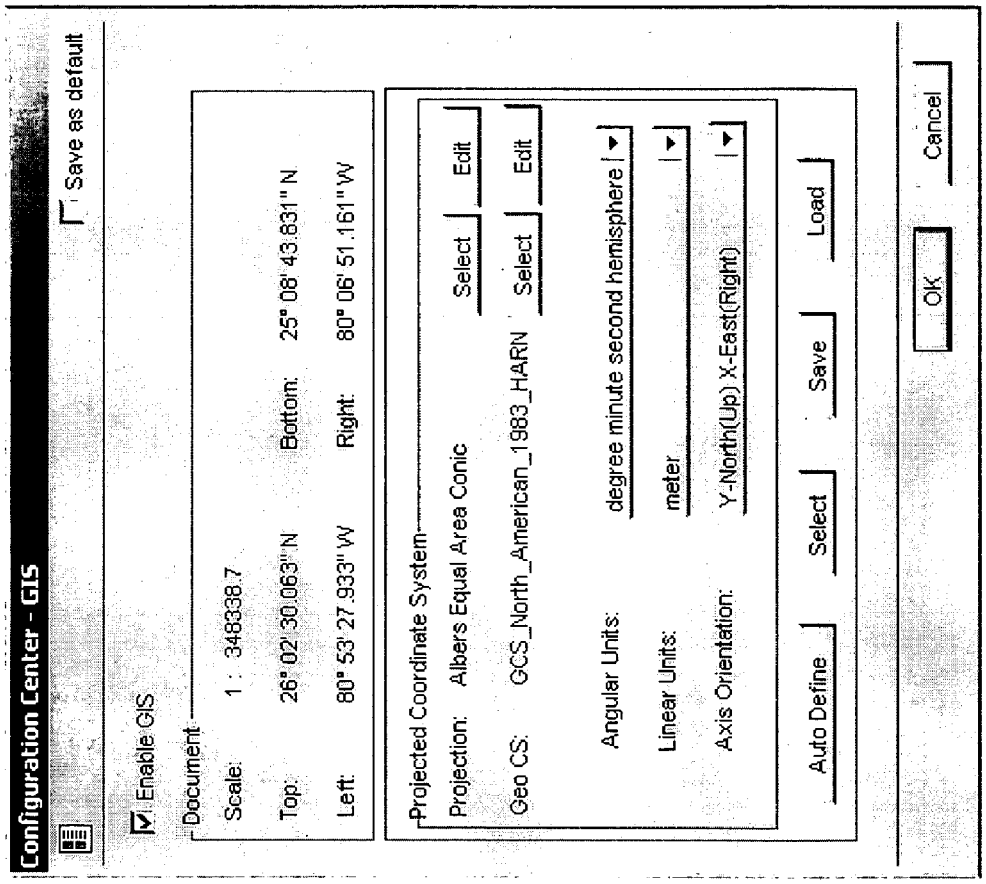
Figure 6H:
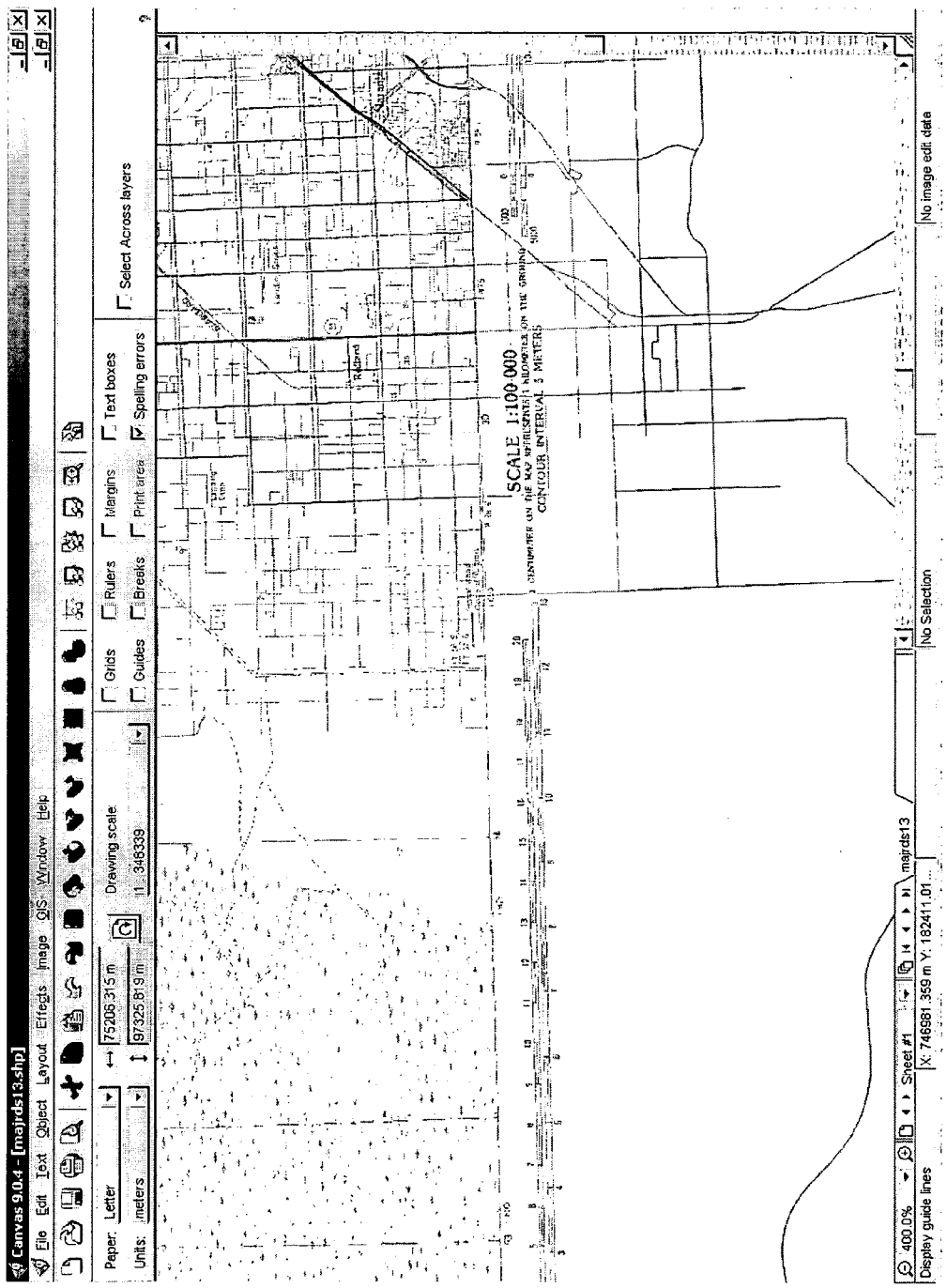
Figure 6I:
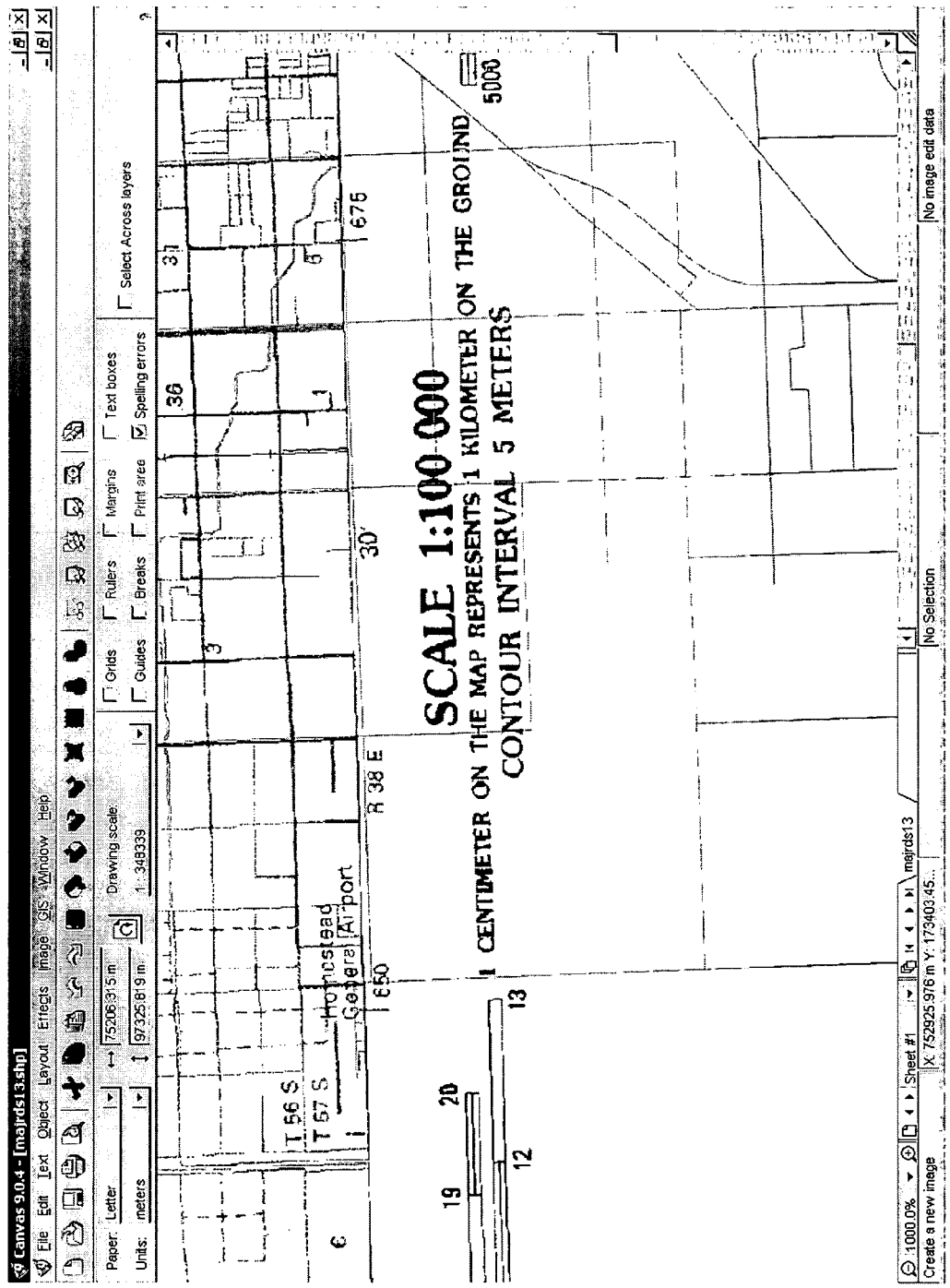
Figure 6J:
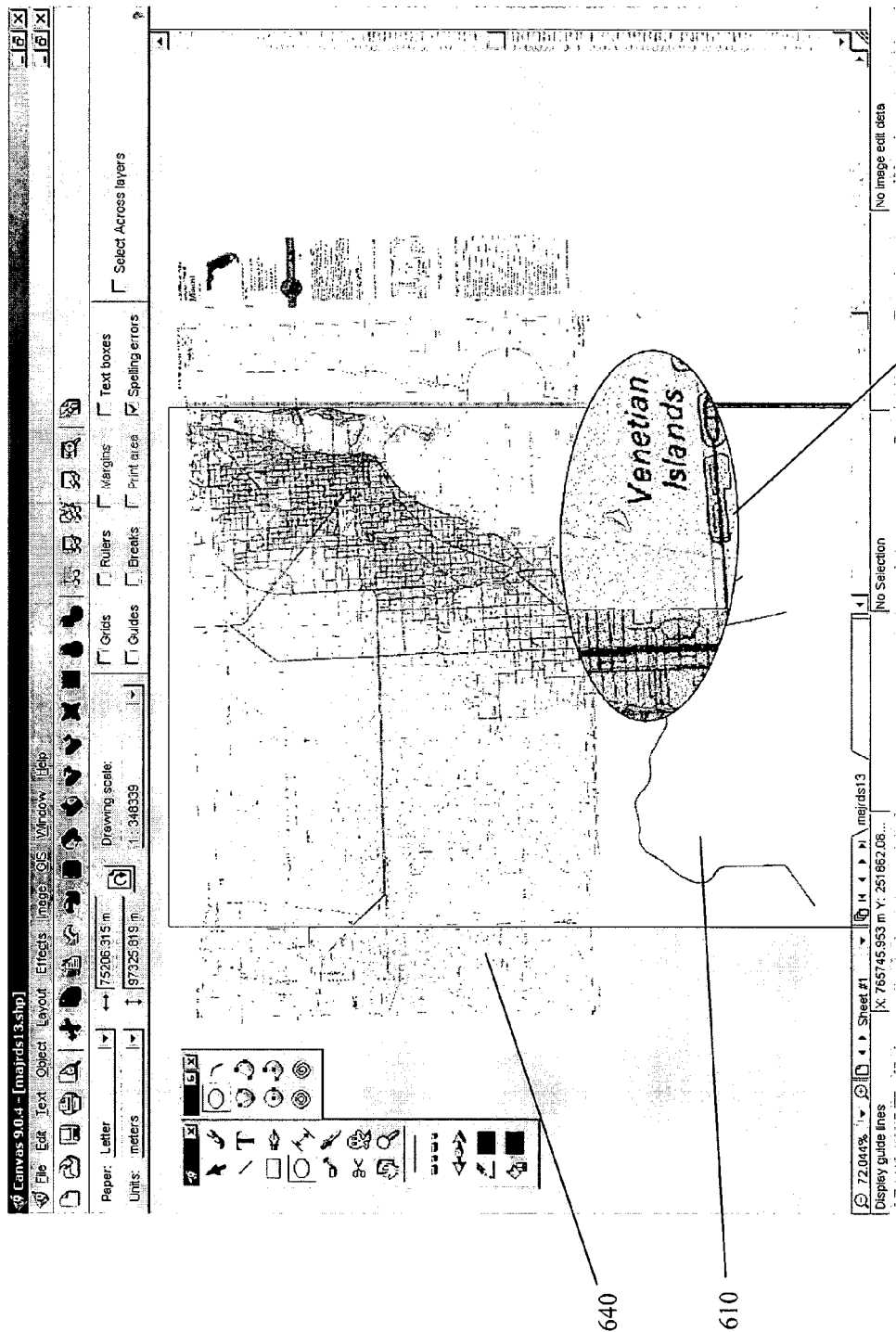
Figure 6K:
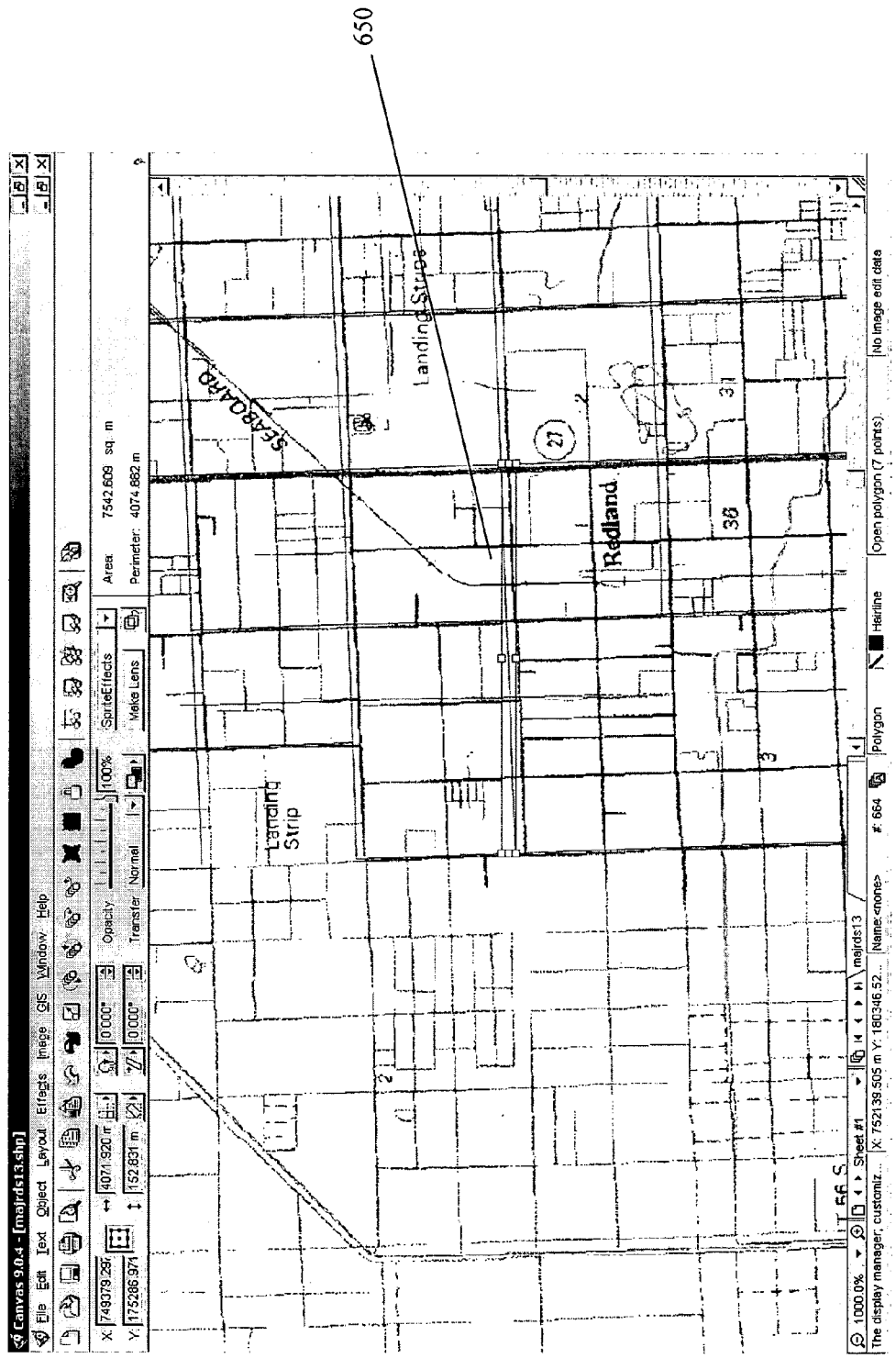
Figure 6L:
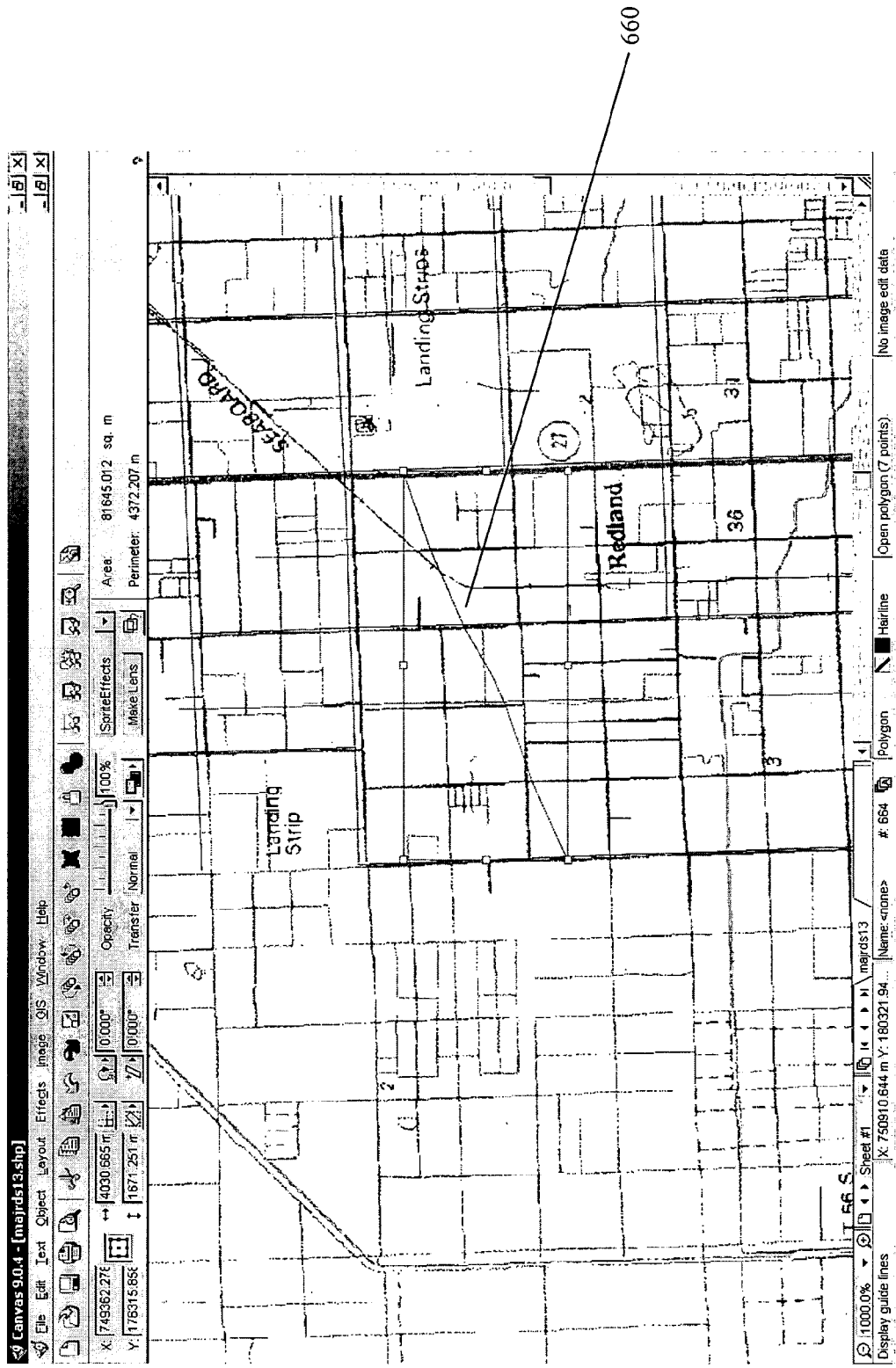
Figure 6M:
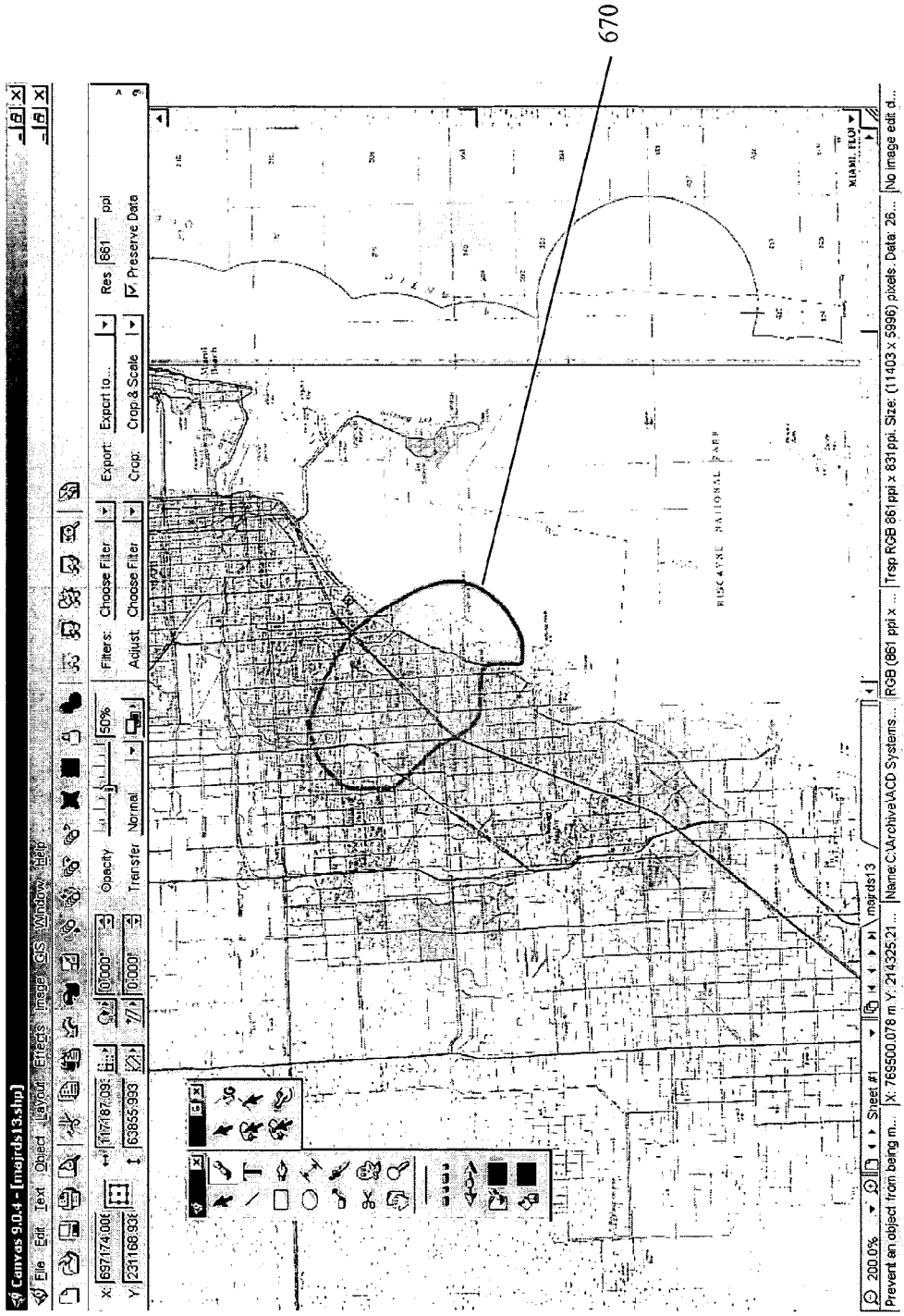
Figure 6N:
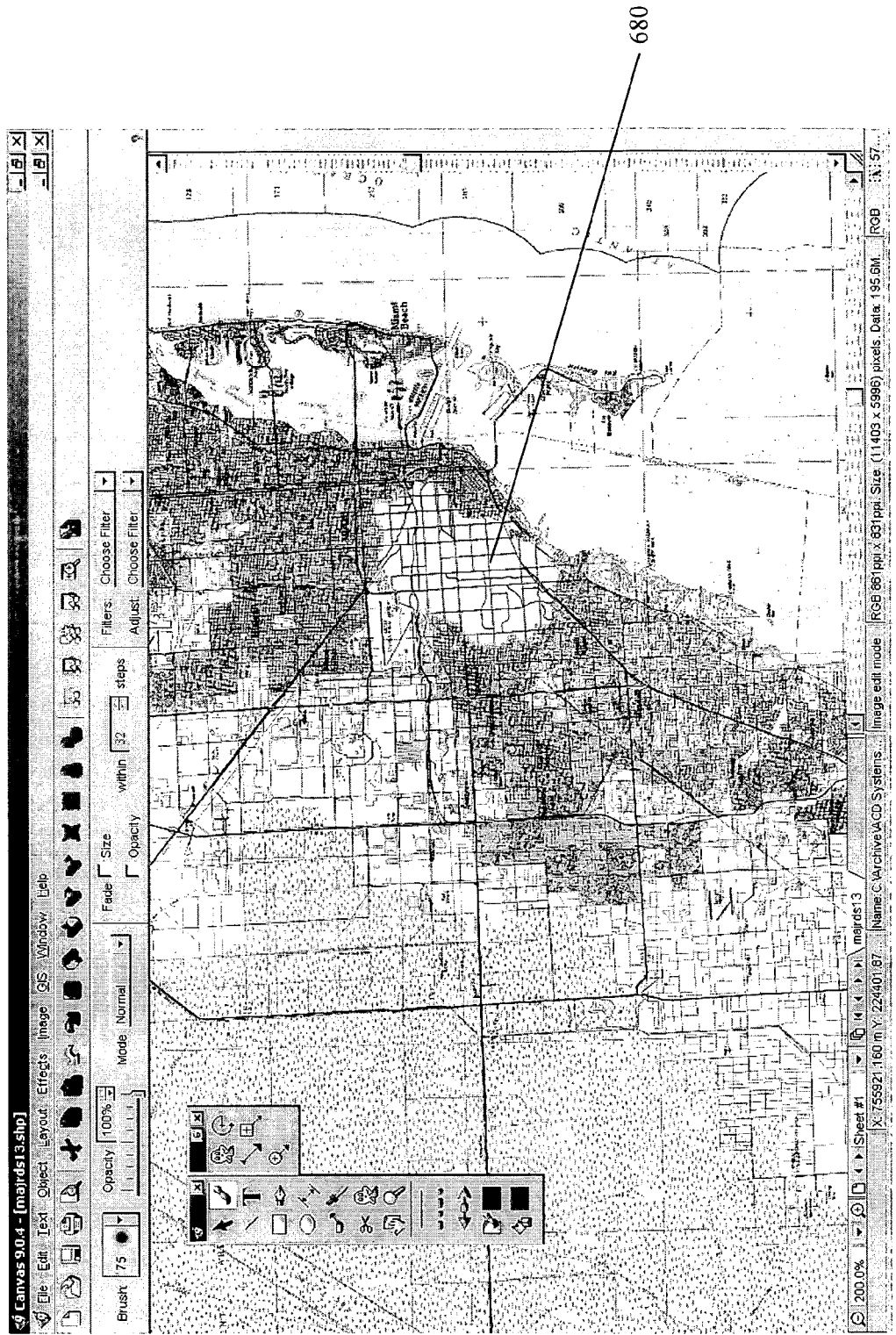

Reference is now made to FIGS. 6A-6N, which are views of a composite GIS image including a vector layer and a raster layer, processed in accordance with a preferred embodiment of the present invention. Shown in FIG. 6A is a vector GIS map 610 corresponding to a shape file for the major roads in Miami, Fla. The shape file for FIG. 6A includes 740 roads, each road preferably represented as an edit path including a series of points connected by line segments. As shown in FIG. 6B, road map 610 displayed in FIG. 6A is rendered using an "Albers Equal Area Conic Projection", to transform GIS coordinates to linear coordinates.

The data for the shape file of FIG. 6A is stored in three files, as follows:

| | |
|---|---|
| majrds.shp | The shape data for the lines segments of the roads |
| majrds.dbf | A database file containing metadata for the roads |
| majrds.prj | A description of the projection used for the shape file |

Shown in FIG. 6C is a portion of the metadata from majrds.dbf. The file majrds.prj contains the following text:

```
PROJCS["Custom",
    GEOGCS["GCS_North_American_1983_HARN",
        DATUM["D_North_American_1983",
            SPHEROID["GRS_1980",6378137,298.257222101]],
        PRIMEM["Greenwich",0],
        UNIT["Degree",0.0174532925199433]],
    PROJECTION["Albers"],
    PARAMETER["False_Easting",400000],
    PARAMETER["False_Northing",0],
    PARAMETER["Central_Meridian",-84],
    PARAMETER["Standard_Parallel_1",24],
    PARAMETER["Standard_Parallel_2",31.5],
    PARAMETER["Central_Parallel",24],
    UNIT["Meter",1]]
```

Specifically, the projection file indicates that the shape file majrds.shp uses a two-dimensional Cartesian coordinate system obtained by projecting the GCS_North_American_1983_HARN geographical coordinate system with D_North_American coordinates, based on an ellipsoid having a semi-major radius equal to 6378137 meters and an inverse flattening of 298.257; using angular units named "degree" with a conversion factor of 0.0174532925199433 to radians. The projection is an Albers projection with parameters False_Easting=400000, False_Northing=0, central meridian=−84, first standard parallel=24, second standard parallel=31.5, central parallel=24, using linear units named "meter" with a conversion factor of 1 to meters.

In general, coordinate systems for GIS images are specified using the following Backus-Naur Form, or variants thereof:

CS (coordinate system)=GeoCS (geographic)|ProjCS (projected)
GeoCS=Datum, Axis Orientation, Angular Unit
Datum=Ellipsoid, Prime Meridian
Prime Meridian=offset from Greenwich
Ellipsoid=semi-major axis, semi-minor axis (or flattening, inverse flattening)
ProjCS=GeoCS, Projection method & parameters, Axis Orientation, Linear Unit
Projection method=Albers, Mercator, etc.

Shown in FIG. 6D is a raster GIS map 620 corresponding to a GEO-TIF file for Miami. The GEO-TIF file is a 22.6 MB file which contains data for an 11403×5996 pixel color image, corresponding to 195.6 MB of uncompressed pixel data. Map 620 in FIG. 6D has been projected using the "UTM Zone 17" projection shown in FIG. 3B. The image displayed in FIG. 6D has been scaled to fit within the screen, and can be magnified to view more detail, as in FIG. 3A. Shown in FIG. 6E is an oval shaped lens 630 that is used as a magnifying glass to examine the map in more detail. Within lens 630 is a 20:1 magnified portion of the map that includes the Venetian Islands.

As shown in FIG. 6F, the GEO-TIF map 620 of FIG. 6D has been imported into the road map of FIG. 6A to form a two-layer composite vector+raster image. The two-layer composite image is generated in accordance with a preferred embodiment of the present invention using the method described in FIG. 4. The layer for the GEO-TIF map has been rendered at an opacity level of 50%, to enable the road map to be seen underneath. It is noted that the map of Miami 640 in FIG. 6F is not identical to the map 620 shown in FIG. 6D. The former has been re-projected to match the "Albers Equal Area Conic Projection", as indicated in FIG. 6G.

FIGS. 6H and 6I are 4:1 and 10:1 magnifications of the composite image displayed in FIG. 6F, respectively, showing the accuracy of the alignment between the vector GIS map 610 and the raster GIS map 640. FIG. 6J shows lens 630 with a 20:1 portion of the composite map that includes the Venetian Islands. Comparing the content of lens 630 in FIG. 6J with the content in FIG. 6E further shows the ability to process the composite vector+raster image, in accordance with a preferred embodiment of the present invention, and further shows the accuracy of the alignment.

FIGS. 6K and 6L show the ability to edit the composite vector+raster image, in accordance with a preferred embodiment of the present invention. Specifically, as shown in FIG. 6K, one of the line objects 650 in the road map of FIG. 6A, corresponding to one of the major roads, is selected and moved to a new location 660 shown in FIG. 6L.

FIG. 6M shows a paint brush stroke 670 applied to the composite image of FIG. 6F, in accordance with a preferred embodiment of the present invention.

In FIG. 6N, the opacity level of GEO-TIF map 640 has been set to 100%, so that vector map 610 is obscured. A portion 680 of map 640 has been cut out using an opacity mask to ghost out map 640 using brush strokes, in accordance with a preferred embodiment of the present invention. As can be seen in FIG. 6N, the opacity mask exposes a portion of vector map 610.

In reading the above description, persons skilled in the art will realize that there are many apparent variations that can be applied to the methods and systems described. Thus, the description above teaches a preferred embodiment for alignment of a raster image with a vector image, by re-projecting the raster image using a second projection, instead of a projection originally used to generate the raster image. In an alternate embodiment the raster image may be maintained, and the vector image may be projected using the same projection that was used to generate the raster image. More generally, the decision of which embodiment to use can be based on the order in which a user imports the vector and raster images. Thus, when a user first opens a vector image and subsequently imports a raster image, as in FIG. 6E, the preferred embodiment of re-projecting the raster image is used; and when the user first opens a raster image and subsequently imports a vector image, the alternate embodiment is used.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A non-transitory computer-readable storage medium storing program code for causing a computer to perform a method of:
   importing a plurality of raster geographical map files, each raster file including geographical information identifying raster image data comprising color values for a plurality of pixel locations (i1, j1), global positioning reference data for identifying pixel locations (i, j) and planar Cartesian coordinates (x, y) that correspond to one another, and a first projection that transforms geographical longitude-latitude coordinates (θ, φ) to planar Cartesian coordinates (x, y);
   importing a vector geographical map file, the vector file including geographical information identifying vector objects;
   for each of the plurality of raster files and their corresponding first projections, rendering a corresponding planar raster image comprising, for each pixel location (i2, j2) from a plurality of pixel locations (i2, j2):
      transforming planar Cartesian coordinates (x2, y2) corresponding to the pixel location (i2, j2), to geographical longitude-latitude coordinates (θ, φ) according to the inverse of a prescribed second projection, wherein the second projection also transforms geographical longitude-latitude coordinates (θ, φ) to planar Cartesian coordinates (x, y);
      re-projecting the resulting geographical longitude-latitude coordinates (θ,φ) to planar Cartesian coordinates (x1,y1) according to the first projection; and
      assigning a color value for the pixel location (i2, j2) according to the color value for the pixel location (i1, j1) corresponding to planar Cartesian coordinates (x1, y1), of the raster geographical map file;
   rendering a planar vector image comprising color values for the plurality of pixel locations (i2, j2), comprising projecting substantially all of the vector objects according to the prescribed second projection; and
   compositing the plurality of rendered planar raster images and the rendered planar vector image as layers of a composite image.

2. The non-transitory computer-readable storage medium of claim 1 further comprising applying a change of coordinate transformation to change coordinates from a first geographical longitude-latitude coordinate system (θ1, φ1), associated within the raster geographical information corresponding to at least one of the raster files, to a second geographical longitude-latitude coordinate system ($\theta 2$, $\phi 2$), associated with the vector geographical information.

3. The non-transitory computer-readable storage medium of claim 1 wherein said rendering a planar vector image further comprises rasterizing the projected vector objects.

4. The non-transitory computer-readable storage medium of claim 1 wherein the global positioning reference data includes top and bottom latitudes, and left and right longitudes.

5. The non-transitory computer-readable storage medium of claim 1 wherein the vector objects include curves represented as at least one line segment.

6. The non-transitory computer-readable storage medium of claim 1 wherein the vector objects include areas represented as polygons with piecewise linear boundaries.

7. The non-transitory computer-readable storage medium of claim 1 further comprising modifying an opacity of the planar raster image within at least one raster layer of the composite image.

8. The non-transitory computer-readable storage medium of claim 1 further modifying an opacity of the planar vector image within the vector layer of the composite image.

9. The non-transitory computer-readable storage medium of claim 1 further comprising masking a portion of the planar raster image with an opacity mask within at least one raster layer of the composite image.

10. The non-transitory computer-readable storage medium of claim 1 further comprising masking a portion of the planar vector image with an opacity mask within the vector layer of the composite image.

11. The non-transitory computer-readable storage medium of claim 1 further comprising modifying a projected vector object within the vector layer of the composite image.

12. The non-transitory computer-readable storage medium of claim 1 further comprising magnifying a lens-shaped portion of the composite image.

13. A GIS system for editing composite geographical images, comprising:
- a raster image file adaptor, for importing a plurality of raster geographical map files, each file including geographical information identifying raster image data comprising color values for a plurality of pixel locations (i1, j1), global positioning reference data for identifying pixel locations (i, j) and planar Cartesian coordinates (x, y) that correspond to one another, and a first projection that transforms geographical longitude-latitude coordinates ($\theta$, $\phi$) to planar Cartesian coordinates (x, y);
- a vector image file adaptor, for importing a vector geographical map file, the file including geographical information identifying vector objects;
- a raster map projector operatively coupled to said raster image file adaptor for rendering, for each of the plurality of raster files and their corresponding first projections, a corresponding planar raster image comprising color values for a plurality of pixel locations (i2, j2), comprising:
  - an inverse projector for transforming planar Cartesian coordinates (x2, y2) corresponding to the pixel locations (i2, j2), to geographical longitude-latitude coordinates ($\theta$, $\phi$) according to the inverse of a prescribed second projection, wherein the second projection also transforms geographical longitude-latitude coordinates ($\theta$, $\phi$) to linear coordinates (x, y), and wherein the second projection is different than the first projection; and
  - a forward projector for projecting the resulting geographical longitude-latitude coordinates ($\theta$, $\phi$) to planar Cartesian coordinates (x1,y1), according to the first projection;

wherein the raster map projector assigns color values for the pixel locations (i2, j2) of the planar raster image according to the color values for pixel locations (i1, j1) corresponding to planar Cartesian coordinates (x1, y1), of the raster geographical map file;
- a vector map projector operatively coupled to said vector image file adaptor for rendering a planar vector image comprising color values for the plurality of pixel locations (i2, j2), comprising a forward vector projector for projecting vector objects to a planar vector image, according to the prescribed second projection; and
- an image compositor for compositing the plurality of rendered planar raster images and the rendered planar vector image as layers of a composite image.

14. The GIS system of claim 13 wherein said raster map projector further comprises a change of coordinate transformer for changing coordinates from a first geographical longitude-latitude coordinate system ($\theta 1$, $\phi 1$), associated within the raster geographical information corresponding to at least one of the raster files, to a second geographical longitude-latitude coordinate system ($\theta 2$, $\phi 2$), associated with the vector geographical information.

15. The GIS system of claim 13 wherein said vector map projector further comprises a vector rasterizer for rasterizing the projected vector objects.

16. The GIS system of claim 13 wherein the global positioning reference data includes top and bottom latitudes, and left and right longitudes.

17. The GIS system of claim 13 wherein the vector objects include curves represented as at least one line segment.

18. The GIS system of claim 13 wherein the vector objects include areas represented as polygons with piecewise linear boundaries.

19. The GIS system of claim 13 further comprising a composite image editor for modifying an opacity of the planar raster image within at least one raster layer of the composite image.

20. The GIS system of claim 13 further comprising a composite image editor for modifying an opacity of the planar vector image within the vector layer of the composite image.

21. The GIS system of claim 13 further comprising a composite image editor for masking a portion of the planar raster image with an opacity mask within at least one raster layer of the composite image.

22. The GIS system of claim 13 further comprising a composite image editor for masking a portion of the planar vector image with an opacity mask within the vector layer of the composite image.

23. The GIS system of claim 13 further comprising a composite image editor for modifying a projected vector object within the vector layer of the composite image.

24. The GIS system of claim 13 further comprising a composite image editor for magnifying a lens-shaped portion of the composite image.

25. A non-transitory computer-readable storage medium storing program code for causing a computer to perform a method of:
- importing a plurality of raster geographical map files, each raster file including geographical information identifying raster image data comprising color values for a plurality of pixel locations (i1, j1), global positioning reference data for identifying pixel locations (i, j) and planar Cartesian coordinates (x, y) that correspond to one another, and a first projection that transforms geographical longitude-latitude coordinates (θ, φ) to planar Cartesian coordinates (x, y);

importing a vector geographical map file, the vector file including planar vector objects corresponding to a second projection, wherein the second projection also transforms geographical longitude-latitude coordinates (θ, φ) to planar Cartesian coordinates (x, y), and wherein the second projection is different than the first projection;

for each of the plurality of raster files and their corresponding first projections, rendering a corresponding planar raster image comprising, for each pixel location (i2, j2) from a plurality of pixel locations (i2, j2):

transforming planar Cartesian coordinates (x2, y2) corresponding to the pixel location (i2, j2), to geographical longitude-latitude coordinates (θ, φ) according to the inverse of the second projection;

re-projecting the geographical longitude-latitude coordinates (θ, φ) to planar Cartesian coordinates (x1, y1) according to the first projection; and assigning a color value for the pixel location (i2, j2) of the planar raster image according to the color value for the pixel location (i1, j1) corresponding to planar Cartesian coordinates (x1, y1), of the raster geographical map file;

rendering a planar vector image comprising rasterizing the planar vector objects; and compositing the plurality of rendered planar raster images and the rendered planar vector image as layers of a composite image.

26. A GIS system for editing composite geographical images, comprising:

a raster image file adaptor, for importing a plurality of raster geographical map files, each file including geographical information identifying raster image data comprising color values for a plurality of pixel locations (i1, j1), global positioning reference data for identifying pixel locations (i, j) and planar Cartesian coordinates (x, y) that correspond to one another, and a first projection that transforms geographical longitude-latitude coordinates (θ, φ) to planar Cartesian coordinates (x, y);

a vector image file adaptor, for importing a vector geographical map file, the file including planar vector objects corresponding to a second projection, wherein the second projection also transforms geographical longitude-latitude coordinates (θ, φ) to planar Cartesian coordinates (x, y), and wherein the second projection is different than the first projection;

a raster map projector operatively coupled to said raster image file adaptor for rendering, for each of the plurality of raster files and their corresponding first projections, a corresponding planar raster image comprising color values for a plurality of pixel locations (i2, j2), comprising:

an inverse projector for transforming planar Cartesian coordinates (x2, y2) corresponding to the pixel locations (i2, j2), to geographical longitude-latitude coordinates (θ, φ) according to the inverse of the second projection; and a forward projector for projecting the resulting geographical longitude-latitude coordinates (θ,φ) to planar Cartesian coordinates (x1,y1), according to the first projection;

wherein the raster map projector assigns color values for the pixel locations (i2, j2) of the planar raster image according to the color values for pixel locations (i1, j1) corresponding to planar Cartesian coordinates (x1, y1), of the raster geographical map file;

a vector map rasterizer operatively coupled to said vector image file adaptor for rendering a planar vector image, comprising rasterizing planar vector objects; and an image compositor for compositing the plurality of rendered planar raster images and the rendered planar vector image as layers of a composite image.

27. A non-transitory computer-readable storage medium storing program code for causing a computer to perform a method of:

importing a plurality of raster geographical map files, each raster file including a planar raster image comprising color values for a plurality of pixel locations (i, j), global positioning reference data for identifying pixel locations (i, j) and planar Cartesian coordinates (x, y) that correspond to one another;

importing a first projection that transforms geographical longitude-latitude coordinates (θ, φ) to planar Cartesian coordinates (x, y);

importing a vector geographical map file, the vector file including information identifying planar vector objects;

rendering a planar vector image, comprising:

inverse projecting the planar vector objects according to a prescribed second projection, wherein the second projection also transforms geographical longitude-latitude coordinates (θ, φ) to planar Cartesian coordinates (x, y);

projecting the resulting inverse-projected vector objects according to the first projection; and assigning color values for the pixel locations (i, j) of the planar vector image according to the color values of corresponding vector objects of the vector geographical map file; and compositing the plurality of planar raster images and the rendered planar vector image as layers of a composite image.

28. A GIS system for editing composite geographical images, comprising:

a raster image file adaptor, for importing a plurality of geographical map files, each file including a planar raster image comprising color values for a plurality of pixel locations (i, j), and global positioning reference data for identifying pixel locations (i, j) and planar Cartesian coordinates (x, y) that correspond to one another, and for importing a first projection that transforms geographical longitude-latitude coordinates (θ, φ) to planar Cartesian coordinates (x, y);

a vector image file adaptor, for importing a geographical map file, the file including information identifying planar vector objects;

a vector map projector operatively coupled to said vector image file adaptor for rendering a planar vector image comprising color values for the plurality of pixel locations (i, j), comprising:

an inverse projector for inverse projecting the planar vector objects according to a prescribed second projection, wherein the second projection also transforms geographical longitude-latitude coordinates (θ, φ) to planar Cartesian coordinates (x, y); and a forward vector projector for projecting the resulting inverse-projected vector objects according to the first projection, wherein the vector map projector assigns color values for the pixel locations (i, j) of the planar vector image according to the color values of corresponding vector objects of the vector geographical map file; and an image compositor for compositing the plurality of planar raster images and the rendered planar vector image as layers of a composite image.

29. The non-transitory computer-readable storage medium of claim 1 wherein the first and second projections are stereographic projections, which project coordinates ($\theta$, $\phi$) on the surface of the earth to planar Cartesian coordinates (x, y).

30. The GIS system of claim 13 wherein the first and second projections are stereographic projections, which project coordinates ($\theta$, $\phi$) on the surface of the earth to planar Cartesian coordinates (x, y).

31. The non-transitory computer-readable storage medium of claim 25 wherein the first and second projections are stereographic projections, which project coordinates ($\theta$, $\phi$) on the surface of the earth to planar Cartesian coordinates (x, y).

32. The GIS system of claim 26 wherein the first and second projections are stereographic projections, which project coordinates ($\theta$, $\phi$) on the surface of the earth to planar Cartesian coordinates (x, y).

33. The non-transitory computer-readable storage medium of claim 27 wherein the first and second projections are stereographic projections, which project coordinates ($\theta$, $\phi$) on the surface of the earth to planar Cartesian coordinates (x, y).

34. The GIS system of claim 28 wherein the first and second projections are stereographic projections, which project coordinates ($\theta$, $\phi$) on the surface of the earth to planar Cartesian coordinates (x, y).

* * * * *